(12) United States Patent
Sakuma et al.

(10) Patent No.: US 7,783,531 B2
(45) Date of Patent: Aug. 24, 2010

(54) CONTAINER MANAGEMENT METHOD AND CONTAINER MANAGEMENT SYSTEM

(75) Inventors: Toshiyuki Sakuma, Kawasaki (JP); Noriyuki Haga, Yokohama (JP); Mitsuhiro Enomoto, Kamakura (JP)

(73) Assignee: Hitachi, Ltd., Tokyo (JP)

(*) Notice: Subject to any disclaimer, the term of this patent is extended or adjusted under 35 U.S.C. 154(b) by 1075 days.

(21) Appl. No.: 11/485,981

(22) Filed: Jul. 14, 2006

(65) Prior Publication Data
US 2007/0168257 A1 Jul. 19, 2007

(30) Foreign Application Priority Data
Jul. 14, 2005 (JP) ............... 2005-205838

(51) Int. Cl.
*G06Q 10/00* (2006.01)
*A01K 5/02* (2006.01)
(52) U.S. Cl. ......................... 705/28; 705/29
(58) Field of Classification Search ................ None
See application file for complete search history.

(56) References Cited
U.S. PATENT DOCUMENTS 6,148,291 A * 11/2000 Radican ................. 705/28
6,631,402 B1 * 10/2003 Devine et al. ............... 709/217
2003/0009396 A1 * 1/2003 DeVries et al. ............. 705/28
2003/0080140 A1 * 5/2003 Neas et al. ..................... 222/1
2003/0212614 A1 * 11/2003 Chu et al. ..................... 705/28
2003/0216831 A1 * 11/2003 Hart et al. ................... 700/235

FOREIGN PATENT DOCUMENTS

| JP | 06-080503 | 3/1994 |
| JP | 2004-000119 | 1/2004 |
| JP | 2004-073187 | 3/2004 |

* cited by examiner

*Primary Examiner*—F. Ryan Zeender
*Assistant Examiner*—Faris Almatrahi
(74) *Attorney, Agent, or Firm*—Mattingly & Malur, P.C.

(57) ABSTRACT

A container stock management technique in a hospital and a culture center is provided. A stock management device (1) manages both transfer (outgoing transfer) of cells sampled at the hospital to the culture center, and transfer (incoming transfer) of the cells cultured from the sampled cells at the culture center, to that hospital, with one working code. The ID of containers used individually for the outgoing transfer and the incoming transfer are made to correspond to an identical working code. The optimum transfer route including the procurement of containers is determined by examining the container stock in each of the hospital and the culture center.

8 Claims, 24 Drawing Sheets

FIG. 3

CONTAINER STOCK DATA STORAGE UNIT 121

| CONTAINER ID 1211 | RESIDUAL TIME 1212 | SITE ID 1213 | STATUS FLAG 1214 |
|---|---|---|---|
| 001 | 20 | HOSPITAL A | OK |
| 002 | 0 | HOSPITAL A | NG |
| 003 | 0 | HOSPITAL A | NG |
| 004 | 12 | HOSPITAL B | OK |
| ⋮ | ⋮ | ⋮ | ⋮ |
| 100 | 10.5 | CULTURE CENTER | OK |
| ⋮ | ⋮ | ⋮ | ⋮ |
| 150 | 10 | CONTAINER MANAGEMENT CENTER | OK |
| ⋮ | ⋮ | ⋮ | ⋮ |

CONTAINER I/O DATA STORAGE UNIT 122

| CONTAINER ID 1221 | SITE ID 1222 | I/O FLAG 1223 | SCHEDULED DATE/TIME 1224 | EXECUTION FLAG 1225 |
|---|---|---|---|---|
| 001 | HOSPITAL A | OUTGOING | 05/06/10/07:00 | ON |
| 002 | CULTURE CENTER | INCOMING | 05/06/10/11:00 | ON |
| 100 | CULTURE CENTER0 | OUTGOING | 05/06/13/08:00 | OFF |
| 100 | HOSPITAL A | INCOMING | 05/06/13/12:00 | OFF |
| ⋮ | ⋮ | ⋮ | ⋮ | ⋮ |

CONTAINER ENVIRONMENT HISTORY DATA STORAGE UNIT 123

| CONTAINER ID | WORKING CODE | SITE ID | | MEASUREMENT HISTORY | | | |
|---|---|---|---|---|---|---|---|
| | | SITE OF DEPARTURE | SITE OF ARRIVAL | DATA 1 | DATA 2 | DATA 3 | ... |
| 001 | 0000001 | HOSPITAL A | CULTURE CENTER | 37°, t1 | 36°, t2 | 36°, t2 | ... |
| 004 | 0000002 | HOSPITAL B | CULTURE CENTER | 36°, t'1 | 36°, t2 | — | ... |
| 008 | 0000003 | CULTURE CENTER | HOSPITAL C | 38°, t"1 | — | — | ... |
| ... | ... | ... | ... | ... | ... | ... | ... |

FIG. 6

WORKING CODE MANAGEMENT DATA STORAGE UNIT 124

| WORKING CODE | PROCUREMENT TRANSFER 1242A | | | | PROCUREMENT TRANSFER 1242B | OUTGOING TRANSFER 1243 | | | | | INCOMING TRANSFER 1244 | | | |
|---|---|---|---|---|---|---|---|---|---|---|---|---|---|---|
| | SITE OF DEPARTURE | SCHEDULED DATE/TIME OF DEPARTURE | DATE/TIME OF DEPARTURE | DATE/TIME OF ARRIVAL | CONTAINER ID | ... | SITE OF DEPARTURE | SCHEDULED DATE/TIME OF DEPARTURE | SITE OF ARRIVAL | DATE/TIME OF DEPARTURE | DATE/TIME OF ARRIVAL | CONTAINER ID | SCHEDULED DATE/TIME OF DEPARTURE | SITE OF DEPARTURE | DATE/TIME OF DEPARTURE | SITE OF ARRIVAL | DATE/TIME OF DEPARTURE | DATE/TIME OF ARRIVAL | CONTAINER ID |
| 00000001 | HOSPITAL D | t1 | HOSPITAL A | t2 | t3 | 006 | ... | HOSPITAL A | t4 | CULTURE CENTER | t5 | t6 | 006 | t7 | CULTURE CENTER | | HOSPITAL A | | | 076 |
| 00000002 | | | | | | | ... | HOSPITAL B | t'1 | CULTURE CENTER | t'2 | | 014 | t'4 | CULTURE CENTER | | HOSPITAL B | | | 083 |
| 00000003 | HOSPITAL C | t1 | CONTAINER MANAGEMENT CENTER | t"1 | t"2 | 032, 047 | ... | | | | | | | | | | | | | |

SITE DATA STORAGE UNIT 125

| SITE ID | NAME | ADDRESS | ALLOWABLE STOCK | RECOVERABLE STOCK |
|---|---|---|---|---|
| CONTAINER MANAGEMENT CENTER | ** CENTER | ********** | 100 | - |
| CULTURE CENTER | ** CENTER | ********** | 50 | 10 |
| HOSPITAL A | ** HOSPITAL | ************ | 5 | 3 |
| HOSPITAL B | ** HOSPITAL | ************ | 5 | 3 |
| ⋮ | ⋮ | ⋮ | ⋮ | ⋮ |

Columns: 1251, 1252, 1253, 1254, 1255 — Table 1250

FIG. 8

SITE LINK DATA STORAGE UNIT 126

| LINK ID | STARTING SITE ID | ENDING SITE ID | LINK COST | LINK MOVING TIME |
|---|---|---|---|---|
| 0001 | CULTURE CENTER | CONTAINER MANAGEMENT CENTER | 100 | 2 |
| 0002 | CULTURE CENTER | HOSPITAL A | 50 | 1 |
| 0003 | CULTURE CENTER | HOSPITAL B | 30 | 3 |
| 0004 | CULTURE CENTER | HOSPITAL C | 35 | 3 |
| ⋮ | ⋮ | ⋮ | ⋮ | ⋮ |

Columns: 1261, 1262, 1263, 1264, 1265 — Table 1260

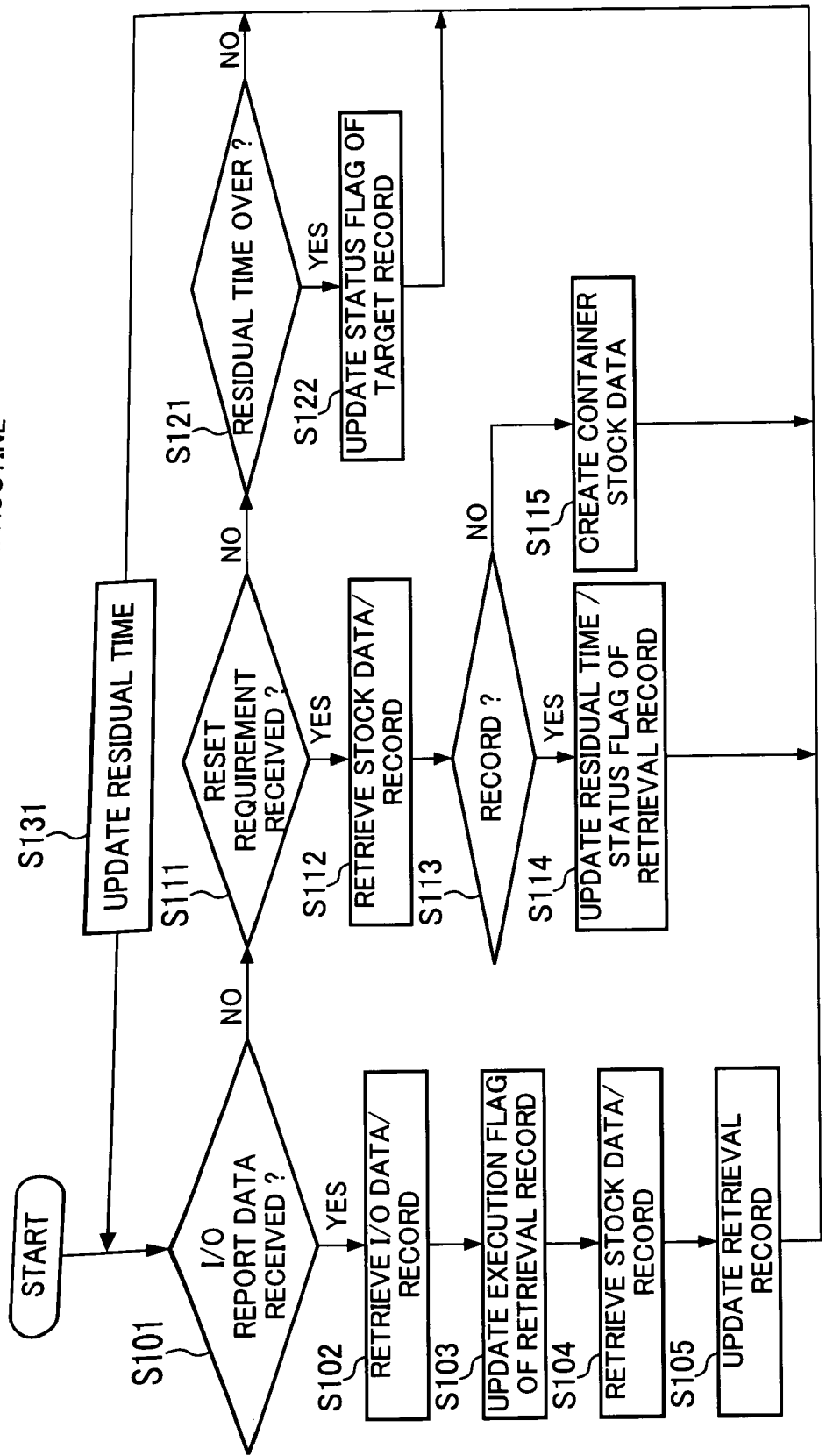

STOCK RESERVING ROUTINE S206

RECOVERED STOCK SPECIFYING ROUTINE S210

WORKING CODE MANAGEMENT DATA UPDATING ROUTINE

CONTAINER ENVIRONMENT HISTORY DATA REGISTERING ROUTINE

TRACK ARRANGEMENT REQUEST CREATING ROUTINE

CONTAINER 8

CONTAINER MANAGEMENT CENTER TERMINAL 2

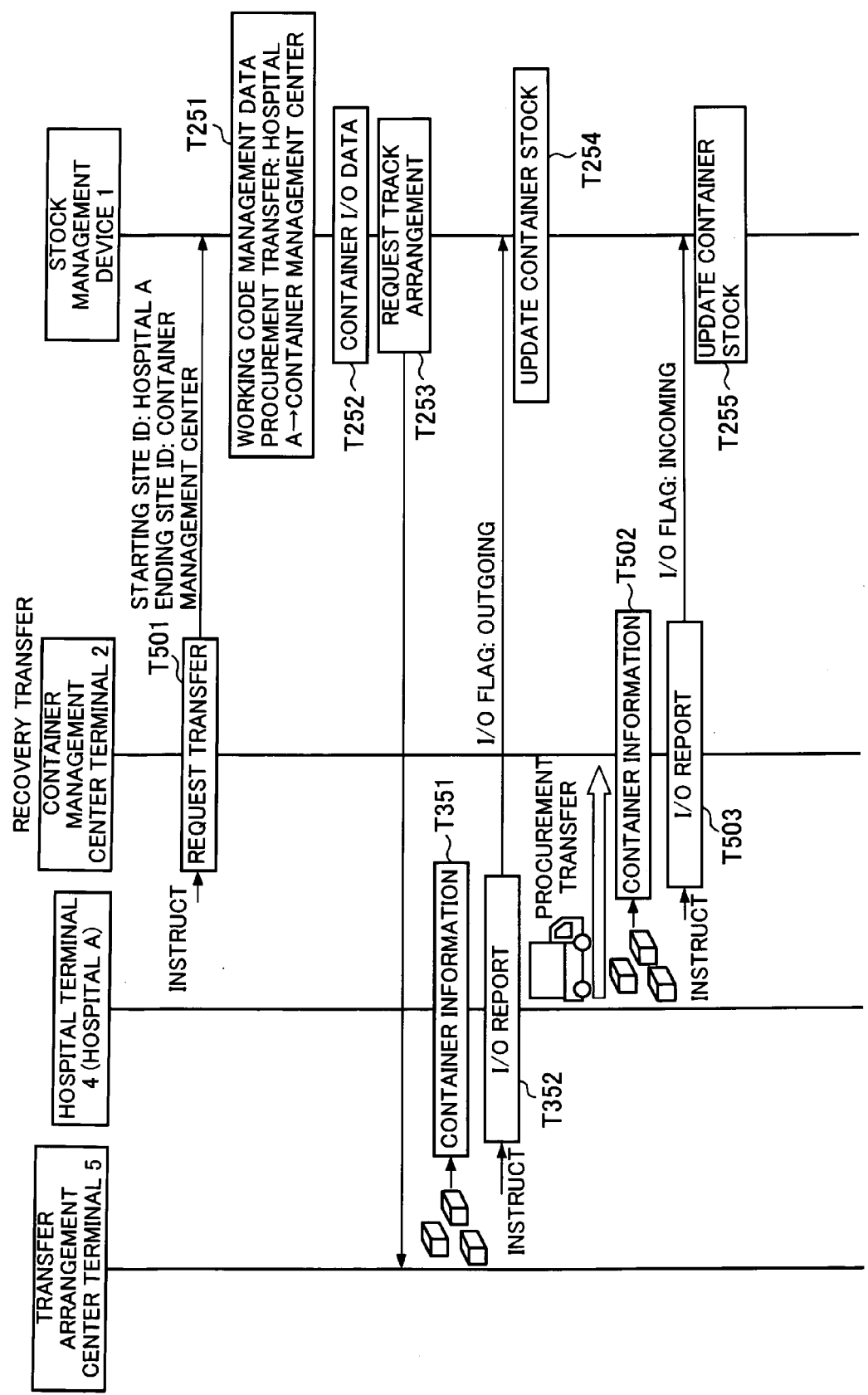

CONTAINER MANAGEMENT METHOD AND CONTAINER MANAGEMENT SYSTEM

BACKGROUND OF THE INVENTION

The present invention relates to a container management technique and, more particularly, to a technique suitable for managing containers to be used for transferring cells sampled from a patient in a hospital, from the hospital to a culture center, or for transferring cells cultured in the culture center, from the culture center to the hospital.

Regenerative medicine has been attracting attention, in which a patient is treated by utilizing cells sampled from the patient and then cultured. In this regenerative medicine, the sampling of the cells and the treatment with the cultured cells are performed in the hospital, but the culture of the cells is performed in the specified culture center. This makes it necessary to transfer the sampled cells and the cultured cells between the hospital and the culture center. In regenerative medicine, therefore, individual management of cells (management of correspondences between the sampled cells and the cultured cells) and status management (management of the cell storing environment) are important.

The individual management technique for the cells is described in Japanese Patent Laid-open Publication No. 2004-119 and Japanese Patent Laid-open publication No. 2004-73187.

In the technique described in Japanese Patent Laid-open Publication No. 2004-119, each time a cell is transferred from one Petri dish to another, the ID numbers attached to the Petri dishes before and after the transfer are read out by a reader and are correlated to each other so that they may be managed in a database. Thus, a correspondence can be made between the patient and the cultured cells contained in the Petri dish.

In the technique described in Japanese Patent Laid-open Publication No. 2004-73187, the Petri dish, as used for transferring the sampled cells from the hospital to the culture center, and the Petri dish, as used for culturing the sampled cells, are correlated in a unit. Thus, the correspondence can be made between the patient and the cells which have been cultured from the cells of that patient.

On the other hand, a technique for managing the status of the cells or the like is described in Japanese Patent Laid-open Publication No. Hei 6-80503. In the technique described in Japanese Patent Laid-open Publication No. Hei 6-80503, a container which transfers an organ or the like is equipped with a sensor to monitor the environmental change in the container.

The container which transfers the cells needs the aforementioned configuration for managing the status of the cells is generally expensive. It is, therefore, preferable that few containers be used to transfer the cells between the hospitals and the culture center. However, it is not simple to perform individual management in the transfer of the cells between the hospitals and the culture center. This is because, if identical patent IDs are prepared in different hospitals, it cannot be guaranteed on the culture center side that they belong to another patient.

SUMMARY OF THE INVENTION

The present invention has been conceived in view of the background thus far described, and has an object to provide a stock management technique for containers in hospitals and culture centers.

In order to solve the aforementioned problems, according to the invention, both the transfer (as will be called the "outgoing transfer") of cells sampled at the hospital, to the culture center, and the transfer (as will be called the "incoming transfer") of the cells cultured from the sampled cells at the culture center, to that hospital, are managed with one working code. The ID of the containers to be used individually for the outgoing transfer and the incoming transfer are made to correspond to an identical working code. The optimum transfer route including the procurement of containers is determined by examining the container stock in each of the hospital and the culture center.

According to the invention, a stock management method for a computer is provided to manage the stock of containers reserved for transfers between sites, wherein the computer includes a storage device stored with a container stock data indicating the stock of the container of each site, a container I/O data indicating the outgoing/incoming schedule of the container at each site, and a link data containing a link moving time between the individual sites, and wherein the computer includes an operation device performs:

an accepting step of accepting a transfer request containing a starting site, a scheduled date/time of outgoing from the starting site, an ending site, and a schedule of outgoing from the ending site, through an input device of the computer;

a site stock calculating step of calculating the stock of containers at the scheduled date/time of outgoing from the site by using the container stock data and the container I/O data of each of the starting site and the ending site contained in the transfer request;

a procurement site searching step of searching the procurement site to procure the container to a stockless site, in the absence of the stock of the container at the scheduled date/time of dispatch from the starting site or the container at the scheduled date/time of dispatch from the ending site;

a stock reserving step of determining the container to be reserved for the procurement transfer from the procurement site to the stockless site, individually by using the container stock data and the container I/O data of the starting site, the ending site and the procurement site, in case the container to be reserved for the outgoing transfer from the starting site to the ending site, the container to be reserved for the incoming transfer from the ending site to the starting site, and the procurement site are searched;

a working code issuing step of issuing for correspondence an identical working code to an outgoing transfer data containing a container to be reserved for the outgoing transfer from the starting site to the ending site, an incoming transfer data containing a container to be reserved for the incoming transfer from the ending site to the starting site, and a procurement transfer data containing a container to be reserved for the procurement transfer from the procurement site to the stockless site, in case the procurement site is searched; and an output step of outputting the outgoing transfer data and the incoming transfer data, to which the identical working code has been made to correspond, and the procurement transfer data in case the procurement site is searched, together with the working code from the output device of the computer.

According to the invention, the outgoing transfer and the incoming transfer are managed in one working code, and the container ID of the container used in each outgoing transfer and each incoming transfer are made to correspond to the same working code. Therefore, it is possible to make a container to be used for transferring the cells sampled from the patient and a container to be used for transferring the cells cultured from those cells, correspond to each other. Moreover, the container stock at each hospital and at the culture center is examined to decide the optimum transfer route including the procurement of the container so that the container stock number at each hospital and at the culture center can be reduced while suppressing the transfer cost of the container.

BRIEF DESCRIPTION OF THE DRAWINGS

FIG. 3 is a diagram showing an example of the registered contents of a container stock data storage unit 121.

FIG. 4 is a diagram showing an example of the registered contents of a container I/O data storage unit 122.

FIG. 5 is a diagram showing an example of the registered contents of a container environment history data storage unit 123.

FIG. 6 is a diagram showing an example of the registered contents of a working code management data storage unit 124.

FIG. 7 is a diagram showing an example of the registered contents of a site data storage unit 125.

FIG. 8 is a diagram showing an example of the registered contents of a site link data storage unit 126.

FIG. 9 is a flow chart for explaining the actions (or the container stock updating routine) of a container stock data management unit 101 and a container I/O data management unit 102.

FIG. 29 is a diagram for explaining the action flows in the recovery transfer of the container stock management system shown in FIG. 1.

DETAILED DESCRIPTION OF THE PREFERRED EMBODIMENTS

Embodiments of the invention are described in the following.

Figure 1:
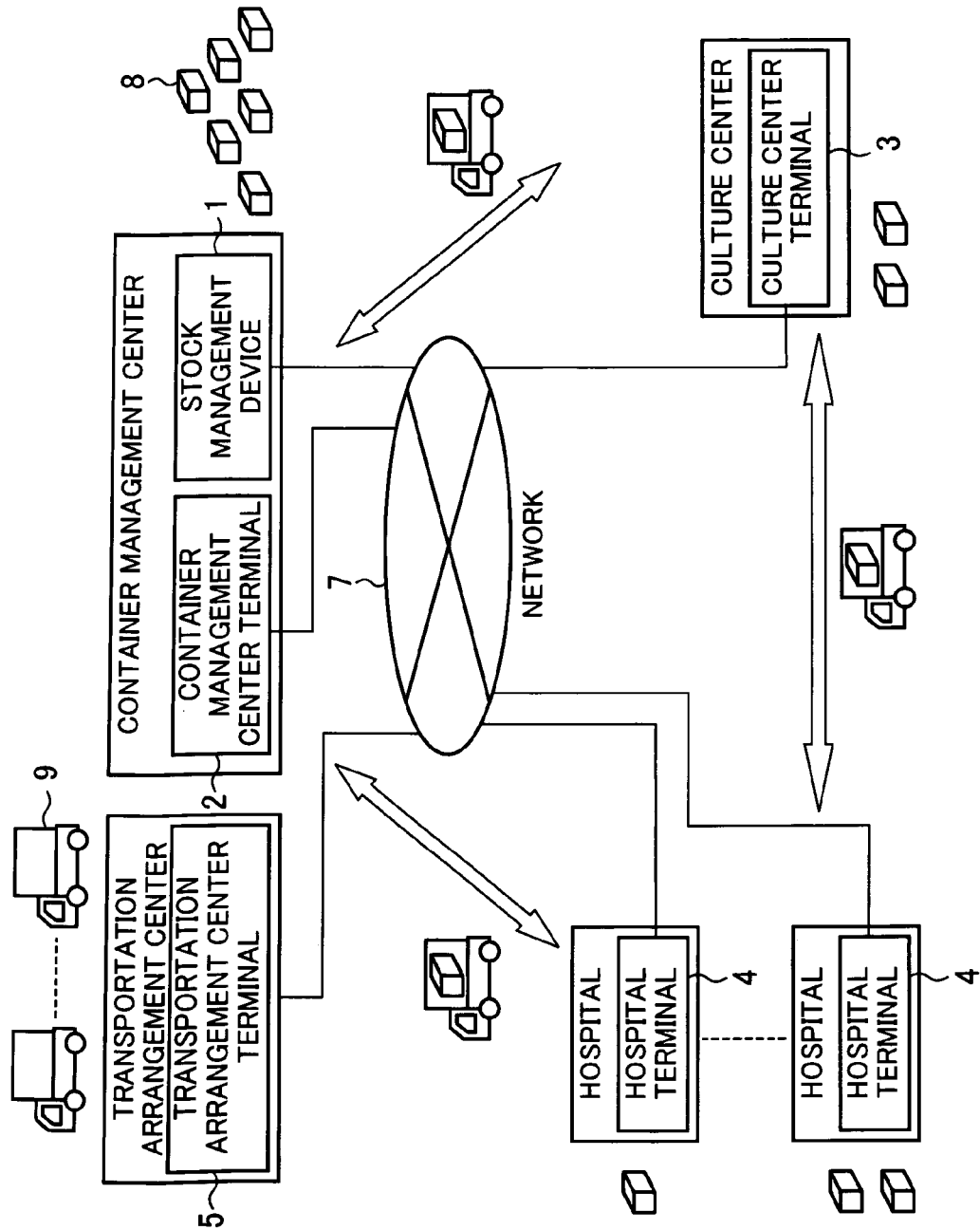
FIG. 1 is a schematic diagram of a container stock management system, to which one embodiment of the invention is applied.

FIG. 1 is a schematic diagram of a container stock management system, to which one embodiment of the invention is applied.

As shown, the container stock management system of this embodiment is constituted such that a stock management device 1 and a container management center terminal 2 disposed in a container management center, a culture center terminal 3 disposed in a culture center, a hospital terminal 4 disposed in each hospital, and a transportation arrangement center terminal 5 disposed in a transportation arrangement center are connected with each other through a network 7 such as the internet. Here, the culture center cultures cells on the basis of a request from a hospital. Each hospital samples the cells from a patient, requests the culture center to culture the sampled cells, and remedies the patient with the cells cultured by the culture center. The container management center manages the stock of a container 8, which is used for the transfer (i.e., the outgoing transfer) of the cells sampled at the hospital to the culture center, and the transfer (i.e., the incoming transfer) of the cells cultured at the culture center to the hospital, and requests the transportation arrangement center for the arrangement of a truck 9 needed for the transfer. The transportation arrangement center arranges, in accordance with the request from the container management center, the truck 9, and performs the transfer of the container 8 among the container management center, the hospital and the culture center.

At first, the stock management device 1 is described in the following.

The stock management device 1 manages the stock of the container 8 in each of the container management center, the hospital and the culture center by utilizing the information from the container management center terminal 2, the culture center terminal, 3 and the hospital terminal 4. It is examined whether or not the stock of the container 8 to be used in the outgoing transfer of the cells sampled at the hospital to the culture center and in the incoming transfer of the cells cultured from those cells at the culture center to that hospital is in the hospital and the culture center. In the presence case, the container 8 to be used for the transfer is reserved from that stock, and the truck arrangement request for the container transfer between the hospital and the culture center is sent to the transportation arrangement center terminal 5. In the absence case, on the other hand, a container procurement site is determined to reserve the container to be used for the transfer, from the container stock of the procurement site, and the truck arrangement request for the container transfer among the container procurement site, the hospital and the culture center is set to the transportation arrangement center terminal 5.

Figure 2:
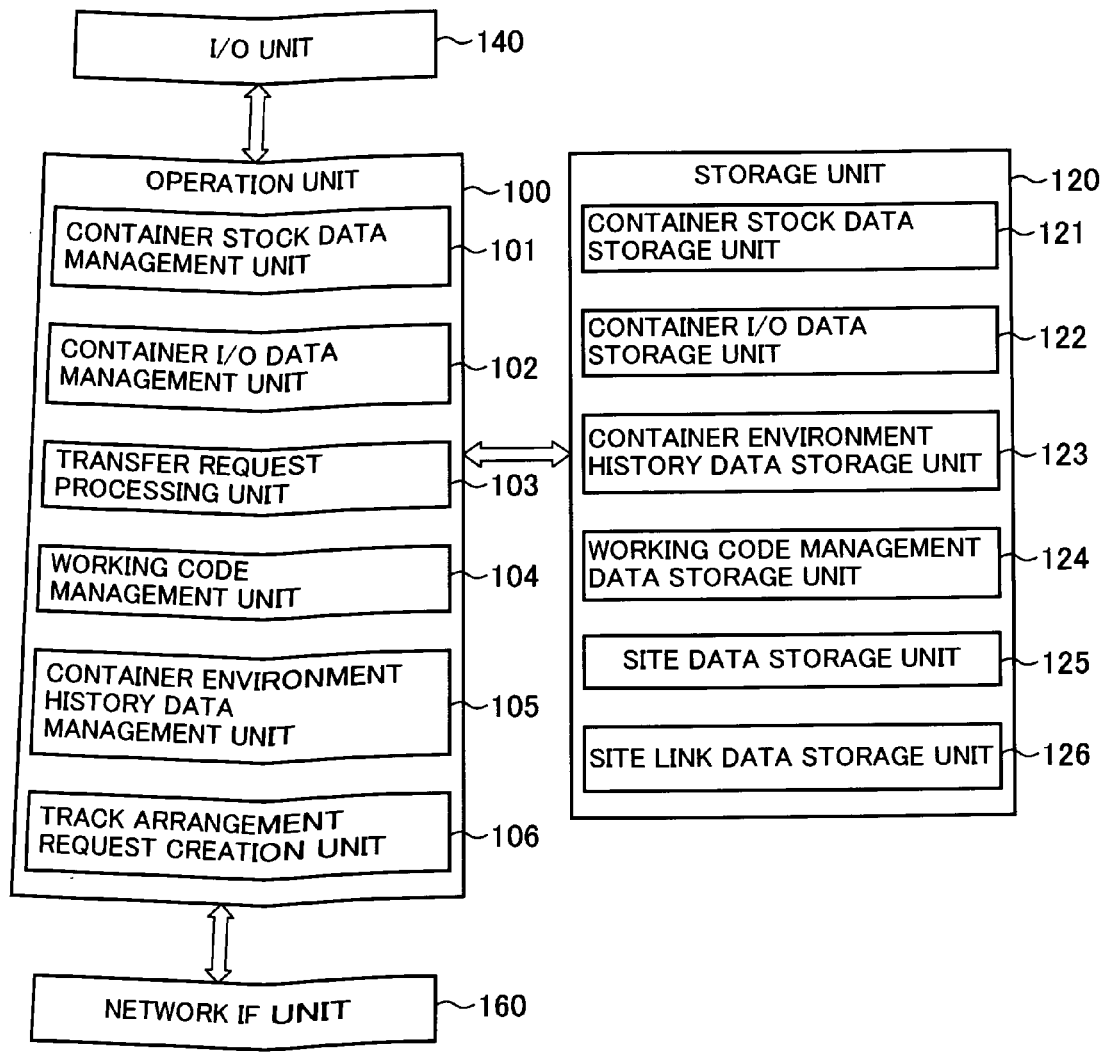
FIG. 2 is a schematic configuration diagram of a stock management device 1.

FIG. 2 is a schematic configuration diagram of the stock management device 1.

As shown, the stock management device 1 of this embodiment includes an operation unit 100, a storage unit 120, an I/O unit 140 which inputs/outputs information with a peripheral device such as a keyboard, a display or a CD-ROM drive, a network IF (interface) unit 160 to be connected with the network 7.

The storage unit 120 includes a container stock data storage unit 121, a container I/O data storage unit 122, a container environment history data storage unit 123, a working code management data storage unit 124, a site data storage unit 125 and a site link data storage unit 126.

The container stock data storage unit 121 is stored with the container stock data indicating the status (the existing site and the using propriety) of each container 8.

FIG. 3 is a diagram showing an example of the registered contents of the container stock data storage unit 121. In each container 8, as shown, there is registered a record 1210 of the container stock data. This record 1210 includes a field 1211 which registers the container ID or the identification information of the container 8, a field 1212 which registers the residual time of the container 8, a field 1213 which registers a site ID or the identification information of the site, at which the container 8 exists, and a field 1214 which registers the status flag indicating the status (i.e., usable or not) of the container 8.

Here, the residual time of the container 8 means the time period which is left till the container 8 has to be recovered for maintenance and inspection by the container management center. Moreover, the site ID to be registered in the field 1213 is the identification information of any of the hospital, the culture center and the container management center. Moreover, the status flag to be registered in the field 1214 is "unusable", incase the target container 8 is reserved for the transfer, in case a trouble is caused by a battery exhaust or a rinsing failure or in case the residual time of the field 1212 becomes lost. The status flag becomes "usable" in other cases. Here, the container 8 is equipped with a device for the status management of the cells contained (i.e., the cells stored in the Petri dish). Specifically, the container 8 is equipped with a device driven by a built-in battery that monitors the environmental information such as the temperature or the humidity thereby to store the monitored result as history data in a memory or the like. The detail of the container 8 will be described hereinafter.

The container I/O data storage unit 122 is stored with the container I/O data indicating the results and schedules of the inter-site movement of the container 8.

FIG. 4 is a diagram showing an example of the registered contents of the container I/O data storage unit 122. At each I/O of the container 8 at the site, there is registered a record 1220 of the container I/O data. This record 1220 includes a field 1221 which registers the container ID of the container 8, a field 1222 which registers the site ID of the site, at which the container 8 incomes or outgoes, a field 1223 which registers an I/O flag indicating whether the container 8 comes in or goes out of the site, a field 1224 which registers the scheduled date/time of incoming and dispatch from the container 8, and a field 1225 which registers the execution flag ("ON" or "OFF") indicating the I/O of the container 8.

The container environment history data storage unit 123 is stored with the container environment history data which indicates the history of the environment data in the container 8 measured while moving between the sites.

FIG. 5 is a diagram showing an example of the registered contents of the container environment history data storage unit 123. At each movement of the container 8 between the sites, as shown, there is registered a record 1230 of the container environment history data. This record 1230 includes a field 1231 which registers the container ID of the container 8, a field 1232 which registers the working code, a field 1233 which registers each of the departure sites and the arrival sites, and a field 1234 which registers the measurement history data indicating the environment data such as the temperature data or the humidity data in the container 8.

Here, the working code is the identification information given for managing the transfer works. This working code establishes the correspondence between the patient's sampled cells to be transferred by the outgoing transfer works and the cultured cells to be transferred by the incoming transfer works. Moreover, the field 1234 has a plurality of subfields 12341 which register the environment data measured, together with the date/time of measurement.

The working code management data storage unit 124 is stored with the working code management data which manages the progress of the transfer works, to which the working codes are applied.

FIG. 6 is a diagram showing an example of the registered contents of the working code management data storage unit 124. In each working code, as shown, there is registered a record 1240 of the working code management data. This record 1240 includes a field 1241 which registers the working code, fields 1242A and 1242B which register various pieces of information of the procurement transfer, a field 1243 which registers various pieces of information of the outgoing transfer, and a field 1244 which registers various pieces of information of the incoming transfer.

Here, the procurement transfer is a transfer for processing the container 8. In case the container 8 which transfers the Petri dishes confining the cells is not at the delivery site, the procurement transfer is caused to transfer the vacant container 8 stocked in another site, to that delivery site, and to recover the container 8 stocked in the hospital or the culture center, in the container management center (for the recovery transfer) so that it may be inspected for the maintenance. As described hereinbefore, the outgoing transfer corresponds to the case, in which the cells sampled at the hospital are sent to the culture center, and the incoming transfer corresponds to the case, in which the cells cultured in the culture center are sent to the hospital.

In case the cells sampled at the hospital are sent to and cultured in the culture center and are returned to the hospital and in case the hospital and the culture center have sufficient stock of the container 8, moreover, the working code is attached to the transfer work composed of the outgoing transfer and the incoming transfer. This transfer work does not contain the procurement transfer. Therefore, the various pieces of information of the procurement transfer are not registered in the field 1242A and 1242B of the record 1240 of the working code. In case the cells sampled at the hospital are sent to and cultured in the culture center and are returned to the hospital and in case one of the hospital and the culture center has insufficient stock of the container 8, on the other hand, the working code is attached to the transfer work composed of one procurement transfer, the outgoing transfer and the incoming transfer. Therefore, the various pieces of information of the procurement transfer are registered in the field 1242A of the record 1240 of that working code. In case the cells sampled at the hospital are sent to and cultured in the culture center and are returned to the hospital and in case both the hospital and the culture center have insufficient stock of the container 8, on the other hand, the working code is attached to the transfer work composed of two procurement transfers, the outgoing transfer and the incoming transfer. Therefore, the various pieces of information of the procurement transfer are registered in the fields 1242A and 1242B of the record 1240 of that working code. In case the container 8 stocked in the hospital or the culture center is recovered for the maintenance and inspection by the container management center, the working code is attached to the transfer work composed of one procurement transfer. Therefore, the various pieces of information of the outgoing transfer and the incoming transfer are not registered in the fields 1242B, 1243 and 1244 of the record 1240 of that working code.

In FIG. 6, moreover, each of the fields 1242 to 1244 includes a sub-field 12451 which registers the site ID of the site of departure, a sub-field 12452 which registers the scheduled data/time of the site of departure, a sub-field 12453 which registers the site ID of the site of arrival, a sub-field 12454 which registers the actual date/time of departure, a sub-field 12455 which registers the actual date/time of arrival, and a sub-field 12456 which registers the container ID of the container 8 to be used for the transfer.

The site data storage unit 125 is stored with the site data indicating various pieces of information of the site.

FIG. 7 is a diagram showing an example of the registered contents of the site data storage unit 125. For each site, as shown, there is registered a record 1250 of the site data. This record 1250 includes a field 1251 which registers the site ID of the site, a field 1252 which registers the name of the site, a field 1253 which registers the address of the site, a field 1254 which registers an allowable stock number, and a field 1255 which registers the recovery stock number. Here, the allowable stock number is the maximum stock number of the container 8 that can be stored at the site. Moreover, the recovery stock number is the stock number of the container 8 needing the maintenance and inspection, which is a threshold at which the recovery work is demanded for the container management center.

The site link data storage unit 126 is stored with the site link data indicating the various pieces of information of the link joining the sites.

FIG. 8 is a diagram showing an example of the registered contents of the site link data storage unit 126. For each link joining the sites, as shown, there is registered a record 1260 of the site link data. This record 1260 includes a field 1261 which registers a link ID or link discriminating information, a field 1262 which registers a site ID of a link starting site, a field 1263 which registers the site ID of the ending site of the link, a field 1264 which registers a link cost, and a field 1265 which registers a moving time (or a transfer lead time) between links. Here, the link cost has a value determined according to the transfer lead time, the link length, the toll and so on.

The description is continued by reverting to FIG. 2. The operation unit 100 includes a container stock data management unit 101, a container I/O data management unit 102, a transfer request processing unit 103, a working code management unit 104, a container environment history data management unit 105 and a truck arrangement request creation unit 106.

The container stock data management unit 101 updates the container stock data storage unit 121 in accordance with the instruction coming from the later-described container I/O data management unit 102. In accordance with the I/O report data of the container 8 received through the network IF unit 160 from the container management center terminal 2, the culture center terminal 3 and the hospital terminal 4, the container I/O data management unit 102 updates the container I/O data storage unit 122, and instructs the container stock data management unit 101 to update the container stock data storage unit 121.

FIG. 9 is a flow chart for explaining the actions (or the container stock updating routine) of the container stock data management unit 101 and the container I/O data management unit 102.

The container I/O data management unit 102 receives the I/O report data containing the container ID, the site ID, the execution date/time and the I/O flag through the network IF unit 160 from any of the container management center terminal 2, the culture center terminal 3 and the hospital terminal 4. When the container I/O data management unit 102 performs this reception (if YES at S101), it retrieves (at S102), with reference to the container I/O data storage unit 122, the record 1220 of the container I/O data, in which container ID, the site ID and the I/O flag contained in the I/O report data are registered in the field 1221 to 1223. Then, the execution flag registered in the field 1225 of the record 1220 retrieved is changed (at S103) from "unset" to "set". Moreover, the container I/O data management unit 102 notifies the container stock data management unit 101 of that I/O report data.

In response to this, the container stock data management unit 101 retrieves (at S104), with reference to the container stock data storage unit 121, the record 1210 of the container stock data, in which the container ID and the site ID contained in that I/O report data are registered in the fields 1211 and 1213. Moreover, the record updated according to the I/O flag of the I/O report data is updated (at S105). Specifically, in case the I/O flag of the I/O report data is "outgoing", the site ID registered in the field 1213 of the record 1210 retrieved is deleted. In case the I/O flag of the I/O report data is "incoming", on the other hand, the site ID of the I/O report data is registered in the field 1213 of the record 1210 retrieved. If the residual time registered in the field 1212 of the record 1210 is left, the status flag registered in the field 1214 of the record 1210 is updated to "usable".

On the other hand, the container stock data management unit 101 refer to the container stock data storage unit 121 retrieves (at S112), when it receives (if YES at S111) the reset request containing the container ID and the site ID from the container management center terminal 2 through the network IF unit 160, the record 1210 of the container stock data, in which the container ID and the site ID contained in the reset request are registered in the fields 1211 and 1213. In case the record 1210 can be retrieved (if YES at S113), the residual time registered in the field 1212 of that record 1210 is reset to the initial value (e.g., 100 hours), and the status flag registered in the field 1214 of that record 1210 is updated (at S114) to "usable". In case the record 1210 cannot be retrieved (if NO at S113), on the contrary, the new record 1210 is added to the container stock data storage unit 121, to register (at S115) the container ID and the site ID contained in the reset request, in the fields 1211 and 1213 of that record 1210, the initial value of the residual time in the field 1212, and the status flag indicating "usable" in the field 1214.

Moreover, the container stock data management unit 101 examines it (at S121) with reference to the container stock data storage unit 121 whether or not the record 1210 has "0" or no residual time registered in the field 1212. In the presence of the record 1210 having "0" residual time (if YES at S121), it is changed (at S122) to the status flag "unusable" registered in the field 1214 of that record 1210.

Moreover, the container stock data management unit 101 measures the lapse time by using the not-shown built-in timer or the like, and updates (at S131) the residual time of the field 1212 of each record 1210, as registered in the container stock data storage unit 121. Specifically, the lapse time from the previous updating time of the residual time to this updating time is subtracted from the residual time. This subtracting operation is repeated for each record 1210 till the residual time of the field 1212 comes to "0".

Reverting to FIG. 2, the explanation of the invention is continued. The transfer request processing unit 103 decides the optimum transfer route of the container 8 in accordance with the transfer request accepted through the network IF unit 160 from the container management center terminal 2 and the hospital terminal 4. The transfer request processing unit 103 creates the working code management data for the transfer request.

Figure 10:
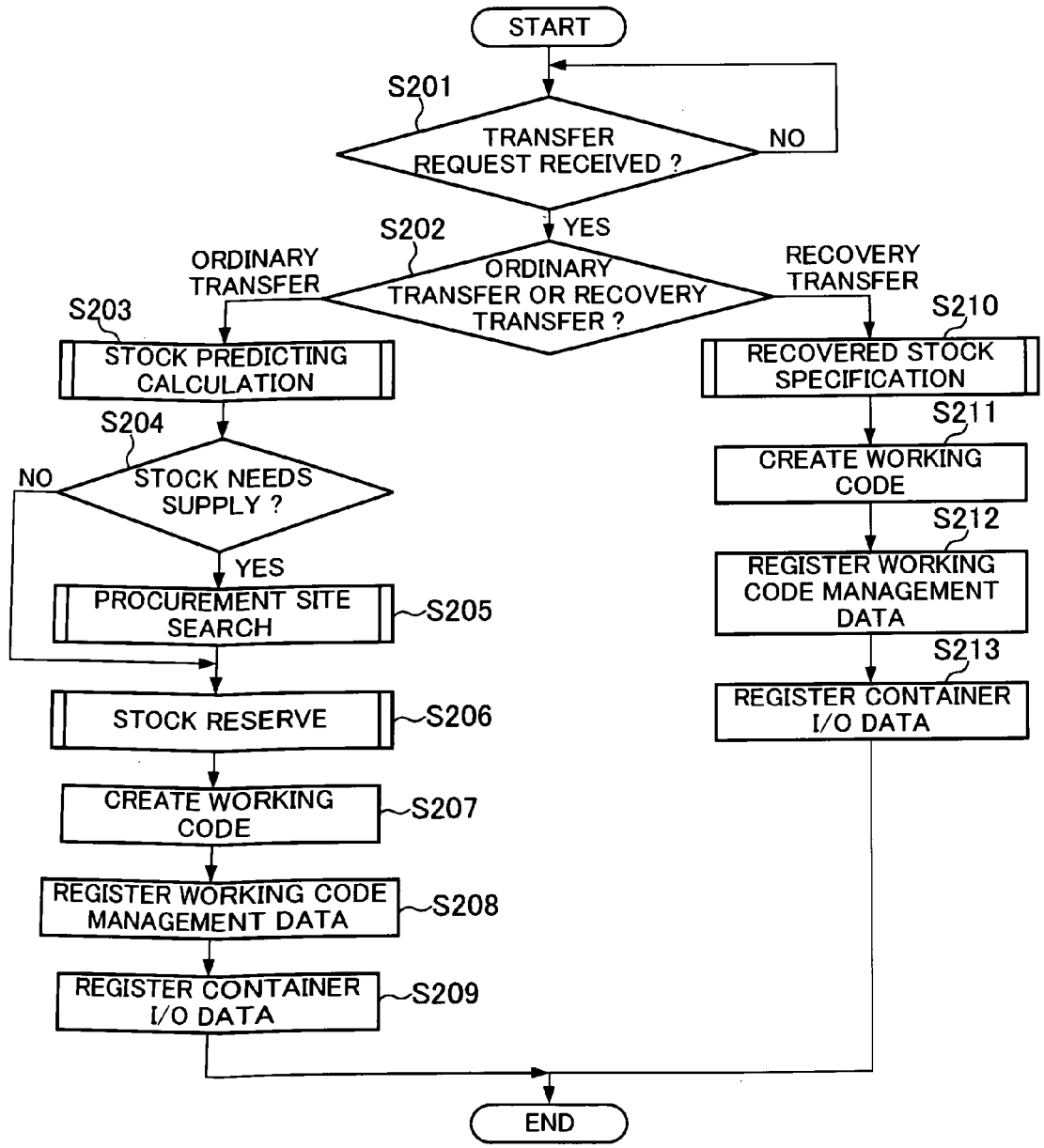
FIG. 10 is a flow chart for explaining the actions (or the working code management data creating routine) of a transfer request processing unit 103.

FIG. 10 is a flow chart for explaining the actions (or the working code management data creating routine) of the transfer request processing unit 103.

The transfer request processing unit 103 examines it (at S202), when it receives the transfer request (if YES at S201) from the container management center terminal 2 or the hospital terminal 4 through the network IF unit 160, whether the transfer request is the ordinary transfer or the recovery transfer. Here, the ordinary transfer is the transfer work (i.e., the outgoing transfer) to transfer the cells sampled at the hospital, from the hospital to the culture center, and the transfer work (i.e., the incoming transfer) to transfer the cells cultured at the culture center, from the culture center to the hospital. Moreover, the recovery transfer is a transfer work to recover the container 8 to be maintained and inspected, from the hospital or the culture center, and to transfer the container to the container management center. It is based on the starting site ID and the ending site ID contained in the transfer request to decide whether that transfer request is the ordinary transfer or the recovery transfer. The transfer request is decided as the ordinary transfer, in case the starting ID is the site ID of the hospital and in case the ending site ID is the site ID of the culture center. On the other hand, the transfer request is decided as the recovery transfer, in case the starting site ID is the site ID of the hospital or the culture center and in case the ending site ID is the site ID of the container management center. The routine advances to S203, in case the decision is made on the ordinary transfer, and to S210 in case the decision is made on the recovery transfer.

At S203, the transfer request processing unit 103 executes the later-described stock prediction calculating routine, and examines it at the scheduled outgoing date/time designated by the transfer request whether or not the stock of the container exists at that hospital. Likewise, it is examined at the scheduled outgoing date/time from the culture center designated by the transfer request whether or not the stock of the container is in that culture center.

Next, the transfer request processing unit 103 advances to S206, if the predicted stock calculation reveals (if NO at S204) that each of the hospital and the culture center has the stock at the scheduled outgoing date/time designated by that transfer request. If there is not stock at the scheduled outgoing date/time (if YES at S204), on the other hand, the transfer request processing unit 103 advances to S205.

At S205, the transfer request processing unit 103 performs the later-described procurement site searching operation to search the site to procure the container 8 to be used for the outgoing transfer or the incoming transfer. The transfer request processing unit 103 decides the scheduled date/time of outgoing from that site. The routine then advances to S206.

At S206, the transfer request processing unit 103 performs the later-described stock reserving operation to reserve the container 8 to be used for the outgoing transfer, from the stock of the hospital. Moreover, the transfer request processing unit 103 reserves the container 8 to be used for the incoming transfer, from the stock of the culture center. In case the procurement site of the container 8 is retrieved at S205, the container 8 to be procured (for the procurement transfer) is reserved from the stock of the procurement site.

In case the hospital, the culture center and the procurement site of the container 8 are searched for the transfer request of the ordinary transfer received at S201, and at S205, the transfer request processing unit 103 creates the unique working code (at S207) when the stock reservation of each procurement site is ended. Moreover, the new record 1240 is added to the working code management data storage unit 124 thereby to register the necessary information (at S208) in the added record 1240.

Specifically, the created working code is registered in the working code created in the field 1241 of the added record 1240. Moreover: the site ID of the hospital contained as the starting site ID in that transfer request is registered in the sub-field 12451 of the field 1243; the scheduled outgoing date/time from the starting site contained in that transfer request is registered in the sub-field 12452 of the field 1243; the site ID of the culture center contained as the ending site ID in the transfer request is registered in the sub-field 12453 of the field 1243; and the container ID of the container 8 reserved for the outgoing transfer is registered in the sub-field 12456 of the field 1243. Likewise: the site ID of the culture center contained as the ending site ID in the transfer request is registered in the sub-field 12451 of the field 1244; the scheduled outgoing date/time from the ending site contained in that transfer request is registered in the sub-field 12452 of the field 1244; the site ID of the hospital contained as the starting site ID in that transfer request is registered in the sub-field 12453 of the field 1244; and the container ID of the container 8 reserved for the incoming transfer is registered in the sub-field 12456 of the field 1244. In case one procurement site of the container 8 is searched at S205, on the other hand: the site ID of the procurement site is registered in a sub-field 12421 of the field 1242A; the scheduled date/time of outgoing from that procurement site is registered in the sub-field 12452 of the field 1242A; the site ID of the procurement transfer destination is registered in that transfer request in the sub-field 12453 of the field 1242A; and the container ID of the container 8 reserved for the procurement transfer is registered in the sub-field 12456 of the field 1242A. In case two procurement sites of the container 8 are searched at S205: the site ID of one procurement site is registered in the sub-field 12421 of the field 1242A; the scheduled date/time of outgoing from one procurement site is registered in the sub-field 12452 of the field 1242A; the site ID of the procurement transfer destination to one procurement site to that transfer request is registered in the sub-field 12453 of the field 1242A; and the container ID of the container 8 reserved for the procurement transfer to one procurement site is registered in the sub-field 12456 of the field 1242A. Moreover: the site ID of the other procurement site is registered in the sub-field 12421 of the field 1242B; the scheduled date/time of outgoing from the other procurement site is registered in the sub-field 12452 of the field 1242B; the site ID of the procurement transfer destination from the other procurement site to that transfer request is registered in the sub-field 12453 of the field 1242B; and the container ID of the container 8 reserved for the procurement transfer to the other procurement site is registered in the sub-field 12456 of the field 1242B.

In accordance with the record 1240 of the working code management data newly registered in the working code management data storage unit 124, moreover, the transfer request processing unit 103 registers (at S209) the record 1220 of the container I/O data in the container I/O data storage unit 122.

Specifically, in case various pieces of information of the procurement transfer are stored in the field 1242A of the record 1240 of the working code management data, two records 1220 of the container I/O data for the procurement transfer are registered. The container ID registered in the sub-field 12456 disposed in the field 1242A of the record 1240 of the working code management data is registered in the field 1221 of one record 1220; the site ID registered in the sub-field 12451 disposed in the field 1242A of that record 1240 is registered in the field 1222 of that record 1220; the I/O flag indicating the "outgoing" is registered in the field 1223 of that record 1220; the scheduled departure date/time registered in the sub-field 12452 disposed in the field 1242A of that record 1240 is registered in the field 1224 of that record 1220; and the execution flag indicating "unset" is registered in the field 1225 of that record 1220.

Moreover: in case various pieces of information of the procurement transfer are stored in the field 1242B of the record 1240 of the working code management data, two records 1220 of the container I/O data for the procurement transfer are registered. The container ID registered in the sub-field 12456 disposed in the field 1242B of the record 1240 of the working code management data is registered in the field 1221 of one record 1220; the site ID registered in the sub-field 12451 disposed in the field 1242B of that record 1240 is registered in the field 1222 of that record 1220; the I/O flag indicating the "outgoing" is registered in the field 1223 of that record 1220; the scheduled departure date/time registered in the sub-field 12452 disposed in the field 1242B of that record 1240 is registered in the field 1224 of that record 1220; and the execution flag indicating "unset" is registered in the field 1225 of that record 1220.

Moreover: the container ID registered in the sub-field 12456 disposed in the field 1242B of the record 1240 of the working code management data is registered in the field 1221 of the other record 1220; the site ID registered in the sub-field 12453 disposed in the field 1242B of that record 1240 is registered in the field 1222 of the record 1220; the I/O flag indicating the "incoming" is registered in the field 1223 of that record 1220; the scheduled arrival date/time is registered in the field 1224 of that record 1220; and the execution flag indicating "unset" is registered in the field 1225 of that record 1220.

Here, the scheduled date/time of arrival to be registered in the field 1224 of the record 1220 is calculated in the following manner. At first, the record 1260 of the site link data, in which the site ID registered in the sub-field 12451 of the fields 1242A and 1242B of the record 1240 is used as the starting site ID and in which the site ID registered in the sub-field 12453 of the fields 1242A and 1242B of the record 1240 is used as the ending site ID, is retrieved from the site link data storage unit 126. The link moving time (or the transfer lead time) registered in the field 1265 of the record 1260 retrieved is added to the scheduled date/time of departure registered in the sub-field 12452 of those fields 1242A and 1242B, thereby to calculate the scheduled date/time of arrival at the ending site ID.

For the various pieces of information of the outgoing transfer registered in the field 1243 of the record 1240 of the working code management data, and the various pieces of information of the incoming transfer registered in the field 1244 of that record 1240, two records 1220 of the container I/O data are individually registered as in the case, in which the various pieces of information of the procurement transfer are stored in the fields 1242A and 1242B of the aforementioned record 1240.

At S210, on the other hand, the transfer request processing unit 103 executes the later-described recovered stock specifying routine thereby to specify the container 8 to be recovered from the site of departure designated by the transfer request. Then, a unique working code is created (at S211) for the transfer request of the recovery transfer received at S201. Moreover, the new record 1240 is added to the working code management data storage unit 124, and the necessary information is registered in the added record 1240 (at S212).

Specifically, the working code created is registered in the field 1241 of the record 1240 added. Moreover: the site ID contained as the starting site ID in that transfer request is registered in the sub-field 12451 of the field 1242A; the scheduled date/time of outgoing from the starting site contained in that transfer request is registered in the sub-field 12452 of the field 1242A; the site ID of the container management center contained as the ending site ID in that transfer request is registered in the sub-field 12453 of the field 1242A; and the container ID of the container 8 specified at S210 and to be recovered is registered in the sub-field 12456 of the field 1242A. In the case of a plurality of containers 8 to be recovered, the container IDs of all the containers 8 are registered in the sub-field 12446.

Moreover, the transfer request processing unit 103 registers (at S213), in accordance with the record 1240 of the working code management data newly registered in the working code management data storage unit 124, the record 1220 of the container I/O data in the container I/O data storage unit 122.

Two records 1220 of the container I/O data are registered for the various pieces of information of the procurement transfer which is registered in the field 1242A of the record 1240 of the working code management data. The container ID registered in the sub-field 12456 disposed in the field 1242A of the record 1240 of the working code management data is registered in the field 1221 of one record 1220; the site ID registered in the sub-field 12451 disposed in the field 1242A of that record 1240 is registered in the field 1222 of that record 1220; the I/O flag indicating the "outgoing" is registered in the field 1223 of that record 1220; the scheduled date/time of departure registered in the sub-field 12452 of that record 1240 is registered in the field 1224 of that record 1220; and the execution flag indicating "unset" is registered in the field 1225 of that record 1220.

Moreover: the container ID registered in the sub-field 12456 disposed in the field 1242A of the record 1240 of the working code management data is registered in the field 1221 of the record 1220; the site ID registered in the sub-field 12453 disposed in the field 1242A of that record 1240 is registered in the field 1222 of that record 1220; the I/O flag indicating the "incoming" is registered in the field 1223 of that record 1220; the scheduled date/time of arrival is registered in the field 1224 of that record 1220; and the execution flag indicating "unset" is registered in the field 1225 of that record 1220. Here, the scheduled arrival date/time to be registered in the field 1224 of the record 1220 is calculated like that of the case of S209.

Figure 11:
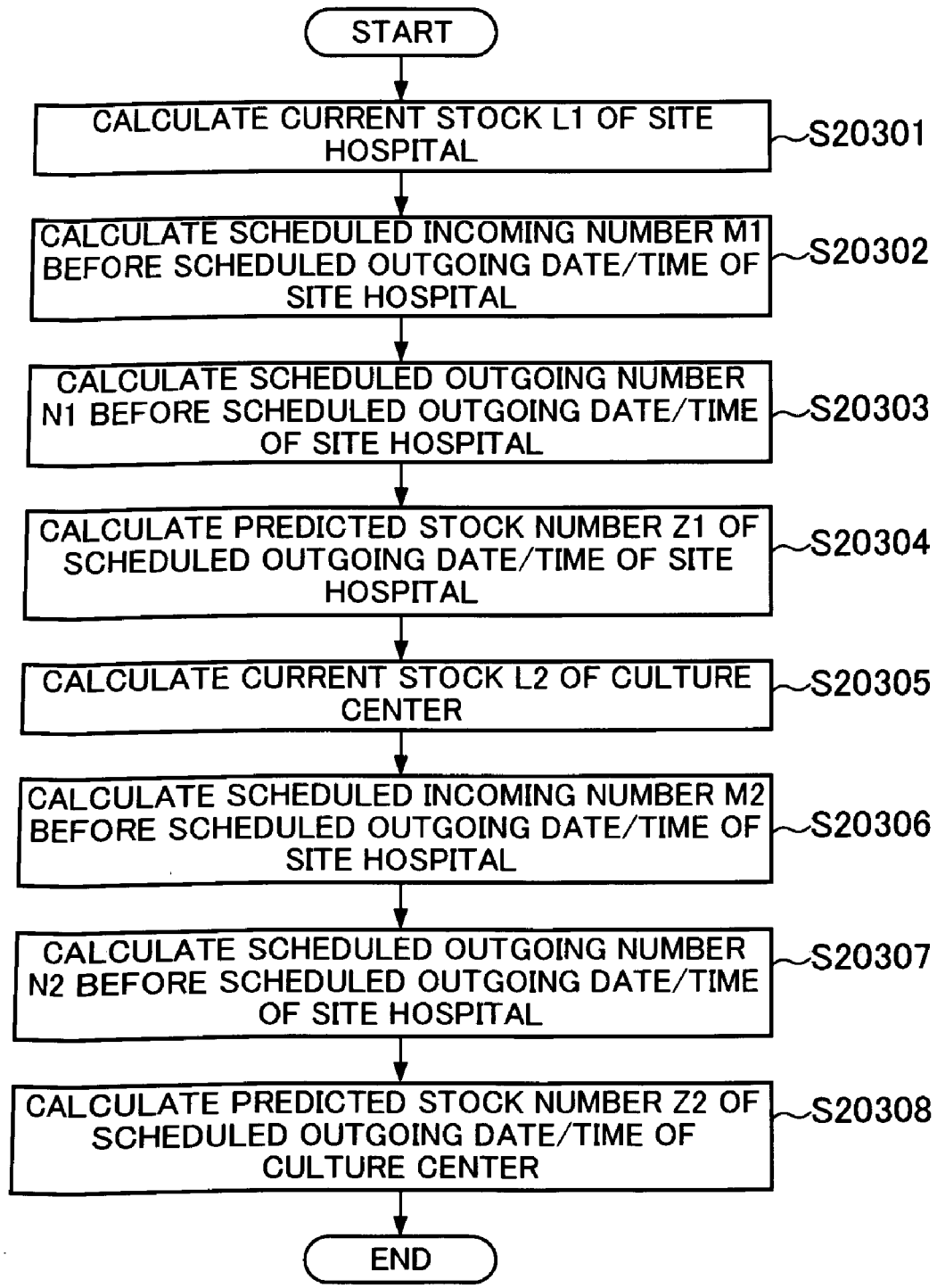
FIG. 11 is a diagram for explaining the stock prediction calculating routine (S203) of FIG. 10.

FIG. 11 is a diagram for explaining the stock prediction calculating routine (at S203) of FIG. 10.

At first, the transfer request processing unit 103 retrieves, with reference to the container stock data storage unit 121, the record 1210, in which the starting site ID (or the site ID of the hospital) contained in the transfer request received through the network IF unit 160 from the hospital terminal 4 is registered in the field 1213, that is, the record 1210, in which the status flag of the field 1214 is set "usable". The record number of the record 1210 retrieved is set (at S20301) to the current stock L1 of the site hospital.

Next, the transfer request processing unit 103 retrieves, with reference to the container I/O data storage unit 122, the record 1220, in which the starting site ID (or the site ID of the hospital) contained in the transfer request received through the network IF unit 160 from the hospital terminal 4 is registered in the field 1222, in which the I/O flag indicating the "incoming" is registered in the field 1223, and in which the execution flag indicating "unset" is registered in the field 1225, that is, the record 1220, in which the predicted execution date/time registered in the field 1224 is on and before the scheduled date/time of dispatch from the starting site contained in that transfer request. The record number of the record 1210 retrieved is set (at S20302) to the scheduled incoming number M1 till the scheduled outgoing date/time of the site hospital.

Next, the transfer request processing unit 103 retrieves, with reference to the container I/O data storage unit 122, the record 1220, in which the starting site ID (or the site ID of the hospital) contained in the transfer request received through the network IF unit 160 from the hospital terminal 4 is registered in the field 1222, in which the I/O flag indicating the "outgoing" is registered in the field 1223, and in which the execution flag indicating "unset" is registered in the field 1225, that is, the record 1220, in which the predicted execution date/time registered in the field 1224 is on and before the scheduled date/time of dispatch from the starting site contained in that transfer request. The record number of the record 1210 retrieved is set (at S20303) to the scheduled outgoing number N1 till the scheduled outgoing date/time of the site hospital.

Then, the transfer request processing unit 103 calculates (the current stock L1 of the site hospital)+(the scheduled incoming number M1 till the scheduled outgoing date/time of the site hospital)−(the scheduled outgoing number N1 till the scheduled outgoing date/time of the site hospital), and sets (at S20304) this calculated result as a scheduled stock number Z1 at the scheduled outgoing date/time of the site hospital.

On the other hand, the transfer request processing unit 103 retrieves, with reference to the container stock data storage unit 121, the record 1210, in which the ending site ID (or the site ID of the culture center) contained in the transfer request received through the network IF unit 160 from the hospital terminal 4 is registered in the field 1213, that is, the record 1210, in which the status flag of the field 1214 is set "usable". The record number of the record 1210 retrieved is set (at S20305) to the current stock L2 of the culture center.

Next, the transfer request processing unit 103 retrieves, with reference to the container I/O data storage unit 122, the record 1220, in which the ending site ID (or the site ID of the culture center) contained in the transfer request received through the network IF unit 160 from the hospital terminal 4 is registered in the field 1222, in which the I/O flag indicating the "incoming" is registered in the field 1223, and in which the execution flag indicating "unset" is registered in the field 1225, that is, the record 1220, in which the predicted execution date/time registered in the field 1224 is on and before the scheduled date/time of dispatch from the ending site contained in that transfer request. The record number of the record 1210 retrieved is set (at S20306) to the scheduled incoming number M2 till the scheduled outgoing date/time of the culture center.

Next, the transfer request processing unit 103 retrieves, with reference to the container I/O data storage unit 122, the record 1220, in which the ending site ID (or the site ID of the culture center) contained in the transfer request received through the network IF unit 160 from the hospital terminal 4 is registered in the field 1222, in which the I/O flag indicating the "outgoing" is registered in the field 1223, and in which the execution flag indicating "unset" is registered in the field 1225, that is, the record 1220, in which the predicted execution date/time registered in the field 1224 is on and before the scheduled date/time of dispatch from the ending site contained in that transfer request. The record number of the record 1210 retrieved is set (at S20307) to the scheduled outgoing number N2 till the scheduled date/time of dispatch from the culture center.

Then, the transfer request processing unit 103 calculates (the current stock L2 of the culture center)+(the scheduled incoming number M2 till the scheduled outgoing date/time of the culture center)−(the scheduled outgoing number N2 till the scheduled outgoing date/time of the culture center), and sets (at S20308) this calculated result as a scheduled stock number Z2 at the scheduled outgoing date/time of the culture center.

Figure 12:
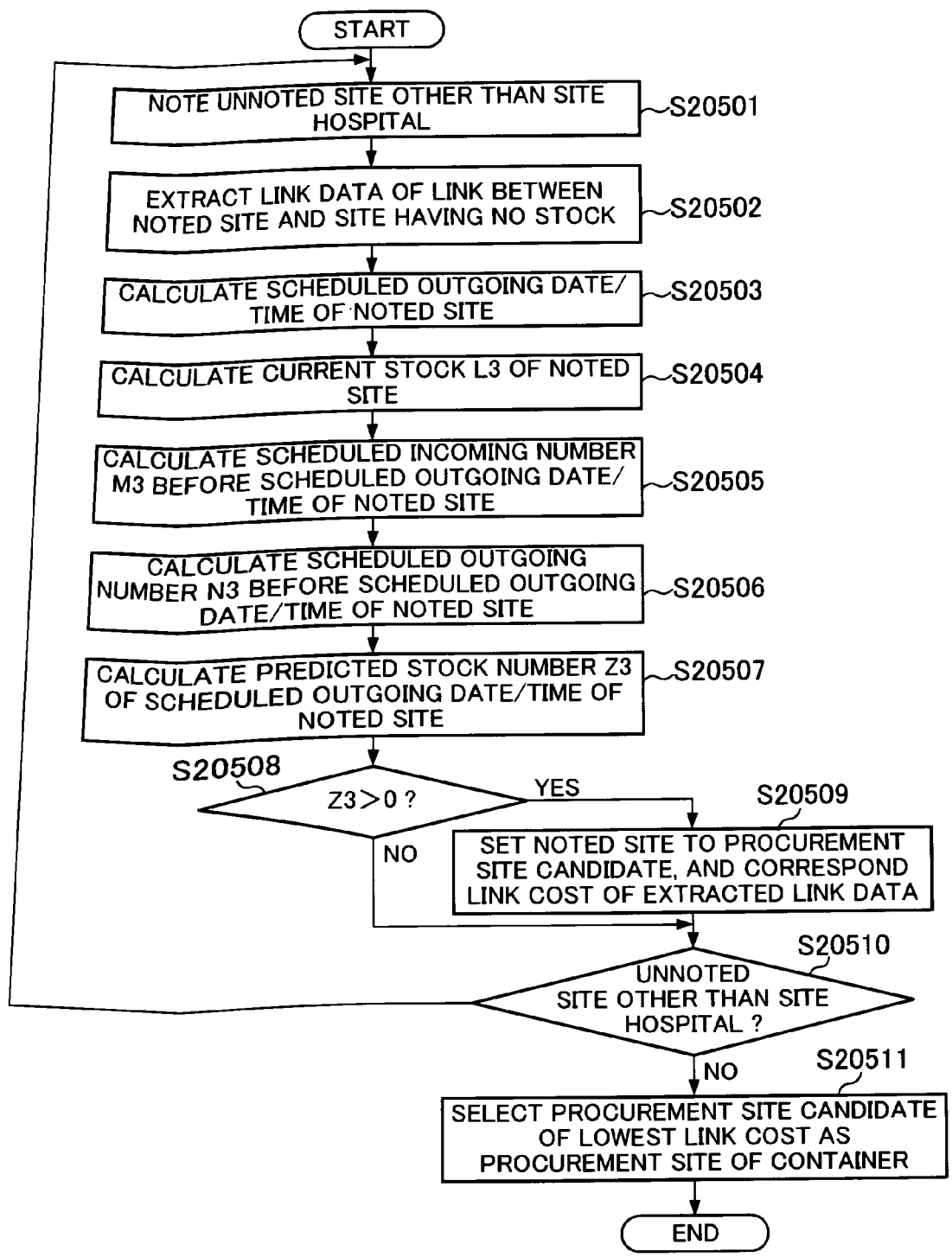
FIG. 12 is a diagram for explaining a procurement site searching routine (S205) of FIG. 10.

FIG. 12 is a diagram for explaining the procurement site searching routine (at S205) of FIG. 10.

This flow is executed at every sites (i.e., the starting site and the ending site), which have been decided to have no stock at the scheduled outgoing date/time.

At first, the transfer request processing unit 103 notes (at S20501), with reference to the site data storage unit 125, the unnoted site ID other than the site ID of the site which has been decided to have no stock at S204 of FIG. 10.

Next, the transfer request processing unit 103 retrieves (at S20502), with reference to the site link data storage unit 126, the record 1260 of the site link data, in which the site ID of the noted site is registered as the starting site ID in the field 1262 and in which the starting site ID contained in that transfer request is registered as the ending site ID. The scheduled outgoing date/time of the noted site is calculated (at S20503) by subtracting both the link moving time, which is registered in the field 1265 of the record 1260 of the site link data retrieved, and the predetermined time period (the lead time needed for the container outgoing work) from the scheduled outgoing date/time of the starting site contained in that transfer request.

Next, the transfer request processing unit 103 retrieves, with reference to the container stock data storage unit 121, the record 1210, in which the site ID of the noted site is registered in the field 1213, that is, the record 1210, in which the status flag of the field 1214 is set "usable" The record number of the record 1210 retrieved is set (at S20504) to the current stock L3 of the noted site.

Moreover, the transfer request processing unit 103 retrieves, with reference to the container I/O data storage unit 122, the record 1220, in which the site ID of the noted site is registered in the field 1222, in which the I/O flag indicating the "incoming" is registered in the field 1223, and in which the execution flag indicating "unset" is registered in the field 1225, that is, the record 1220, in which the predicted execution date/time registered in the field 1224 is on and before the scheduled date/time of dispatch from the noted site calculated at S20503. The record number of the record 1210 retrieved is set (at S20505) to the scheduled incoming number M3 till the scheduled date/time of dispatch from the noted site.

Moreover, the transfer request processing unit 103 retrieves, with reference to the container I/O data storage unit 122, the record 1220, in which the site ID of the noted site is registered in the field 1222, in which the I/O flag indicating the "outgoing" is registered in the field 1223, and in which the execution flag indicating "unset" is registered in the field 1225, that is, the record 1220, in which the predicted execution date/time registered in the field 1224 is on and before the scheduled date/time of dispatch from the noted site calculated at S20503. The record number of the record 1210 retrieved is set (at S20506) to the scheduled outgoing number N3 till the scheduled date/time of dispatch from the noted site.

Then, the transfer request processing unit 103 calculates (the current stock L3 of the noted site)+(the scheduled incoming number M3 till the scheduled outgoing date/time of the noted site)–(the scheduled outgoing number N3 till the scheduled outgoing date/time of the noted site), and sets (at S20507) this calculated result as a scheduled stock number Z3 at the scheduled outgoing date/time of the noted site.

Next, the transfer request processing unit 103 examines (at S20508) whether or not the stock number Z3 at the scheduled outgoing date/time of the noted site is Z3>3. If not Z3>0, no procurable stock is at the noted site. In this case, the routine advances to S20510. If Z3>0, on the other hand, a procurable stock is at the noted site. In this case, the noted site is set to a procurement site candidate, and the site ID of the noted site is so stored in the storage unit 120 or the like as to correspond to the link cost registered in the field 1264 of the record 1260 retrieved at S20502 and the scheduled outgoing date/time calculated at S20503. The routine then advances to S20510.

At S20510, the transfer request processing unit 103 examines whether or not the record 1250 of the unnoted site ID other than the site ID of the site, which has been decided to have no stock at S204 of FIG. 10, exists in the site data storage unit 125. If this answer is YES (at S20510), the routine returns to S20501. If the answer is NO (at S20510), on the contrary, the procurement site candidate having the least link cost is selected (at S20511) as the procurement site of the container 8 from the procurement site candidate set at S20509.

Figure 13:
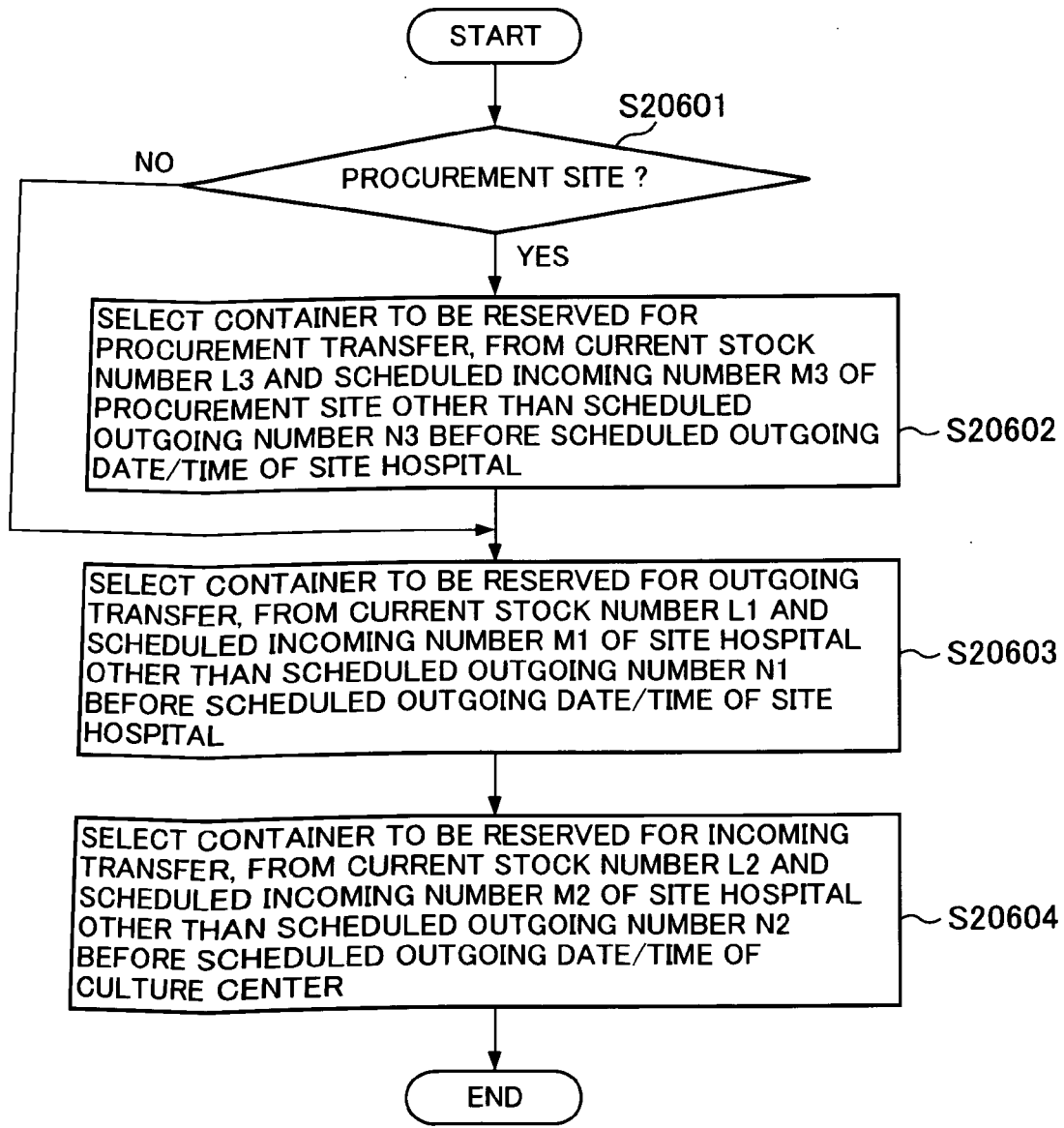
FIG. 13 is a diagram for explaining a stock reserving routine (S206) of FIG. 10.

FIG. 13 is a diagram for explaining the stock reserving routine (at S206) of FIG. 10.

At first, the transfer request processing unit 103 advances to S20602, if the procurement site is selected by the procurement site searching routine (at S205) (if YES at S20601), but otherwise (if NO at S20601) to S20603. Here, the operation of S20603 is performed at each procurement site selected, in case two procurement sites are selected by the procurement site searching routine (at S205).

At S20602, the transfer request processing unit 103 retrieves, with reference to the container stock data storage unit 121, the record 1210, in which the site ID of the procurement site is registered in the field 1213, that is, the record 1210, in which the status flag of the field 1214 is set "usable". And, the record number of the retrieved record 1210 is the current stock L3 of the procurement site. With reference to the container I/O data storage unit 122, moreover, the transfer request processing unit 103 retrieves the record 1220, in which the site ID of the procurement site is registered in the field 1222, in which the I/O flag indicating the "incoming" is registered in the field 1223, and in which the execution flag indicating the "unset" is registered in the field 1225, that is, the record 1220, in which the predicted execution date/time registered in the field 1224 is on and before the scheduled date/time of dispatch from the procurement site. And, this retrieved record 1220 is scheduled to come in before the scheduled outgoing date/time of the procurement site. The transfer request processing unit 103 further retrieves the record 1220, in which the site ID of the procurement site is registered in the field 1222, in which the I/O flag indicating the "outgoing" is registered in the field 1223, and in which the execution flag indicating the "unset" is registered in the field 1225, that is, the record 1220, in which the predicted execution date/time registered in the field 1224 is on and before the scheduled date/time of dispatch from the procurement site. And, this retrieved record 1220 is scheduled to go out before the scheduled outgoing date/time of the procurement site. Then, the transfer request processing unit 103 selects one of the container ID, which is registered in the record 1210 retrieved as the current stock L3 of the procurement site, and which is registered in the record 1220 scheduled to come in before the scheduled outgoing date/time, that is, the container ID other than that which is registered in the record 1220 scheduled to go out before the scheduled date/time of dispatch from the procurement site, and the container ID selected is selected into the container 8 to be reserved for the procurement transfer. Moreover, the transfer request processing unit 103 retrieves the record 1210 having that container ID, from the container stock data storage unit 121, and changes the status flag registered in the field 1214 of that record 1210, into the "unusable". After this, the routine advances to S20603.

At S20603, the transfer request processing unit 103 retrieves, with reference to the container stock data storage unit 121, the record 1210, in which the site ID of the site hospital is registered in the field 1213, that is, the record 1210, in which the status flag of the field 1214 is set "usable". And, the record number of the retrieved record 1210 is the current stock L1 of the site hospital. With reference to the container I/O data storage unit 122, moreover, the transfer request processing unit 103 retrieves the record 1220, in which the site ID of the site hospital is registered in the field 1222, in which the I/O flag indicating the "incoming" is registered in the field 1223, and in which the execution flag indicating the "unset" is registered in the field 1225, that is, the record 1220, in which the predicted execution date/time registered in the field 1224 is on and before the scheduled date/time of dispatch from the site hospital. And, this retrieved record 1220 is scheduled to come in before the scheduled outgoing date/time of the site hospital. The transfer request processing unit 103 further retrieves the record 1220, in which the site ID of the site hospital is registered in the field 1222, in which the I/O flag indicating the "outgoing" is registered in the field 1223, and in which the execution flag indicating the "unset" is registered in the field 1225, that is, the record 1220, in which the predicted execution date/time registered in the field 1224 is on and before the scheduled date/time of dispatch from the site hospital. And, this retrieved record 1220 is scheduled to go out before the scheduled outgoing date/time of the site hospital. Then, the transfer request processing unit 103 selects one of the container ID, which is registered in the record 1210 retrieved as the current stock L1 of the site hospital, and which is registered in the record 1220 scheduled to come in before the scheduled outgoing date/time, that is, the container ID other than that which is registered in the record 1220 scheduled to go out before the scheduled date/time of dispatch from the site hospital, and the container ID selected is selected into the container 8 to be reserved for the outgoing transfer. Moreover, the transfer request processing unit 103 retrieves the record 1210 having that container ID, from the container stock data storage unit 121, and changes the status flag registered in the field 1214 of that record 1210, into the "unusable". After this, the routine advances to S20604.

At S20604, the transfer request processing unit 103 retrieves, with reference to the container stock data storage unit 121, the record 1210, in which the site ID of the culture center is registered in the field 1213, that is, the record 1210, in which the status flag of the field 1214 is set "usable" And, the record number of the retrieved record 1210 is the current stock L2 of the culture center. With reference to the container I/O data storage unit 122, moreover, the transfer request processing unit 103 retrieves the record 1220, in which the site ID of the culture center is registered in the field 1222, in which the I/O flag indicating the "incoming" is registered in the field 1223, and in which the execution flag indicating the "unset" is registered in the field 1225, that is, the record 1220, in which the predicted execution date/time registered in the field 1224 is on and before the scheduled date/time of dispatch from the culture center. And, this retrieved record 1220 is scheduled to come in before the scheduled outgoing date/time of the culture center. The transfer request processing unit 103 further retrieves the record 1220, in which the site ID of the culture center is registered in the field 1222, in which the I/O flag indicating the "outgoing" is registered in the field 1223, and in which the execution flag indicating the "unset" is registered in the field 1225, that is, the record 1220, in which the predicted execution date/time registered in the field 1224 is on and before the scheduled date/time of dispatch from the culture center. And, this retrieved record 1220 is scheduled to go out before the scheduled outgoing date/time of the culture center. Then, the transfer request processing unit 103 selects one of the container ID, which is registered in the record 1210 retrieved as the current stock L2 of the culture center, and which is registered in the record 1220 scheduled to come in before the scheduled outgoing date/time, that is, the container ID other than that which is registered in the record 1220 scheduled to go out before the scheduled date/time of dispatch from the culture center, and the container ID selected is selected into the container 8 to be reserved for the incoming transfer. Moreover, the transfer request processing unit 103 retrieves the record 1210 having that container ID, from the container stock data storage unit 121, and changes the status flag registered in the field 1214 of that record 1210, into the "unusable". After this, this flow is ended.

Figure 14:
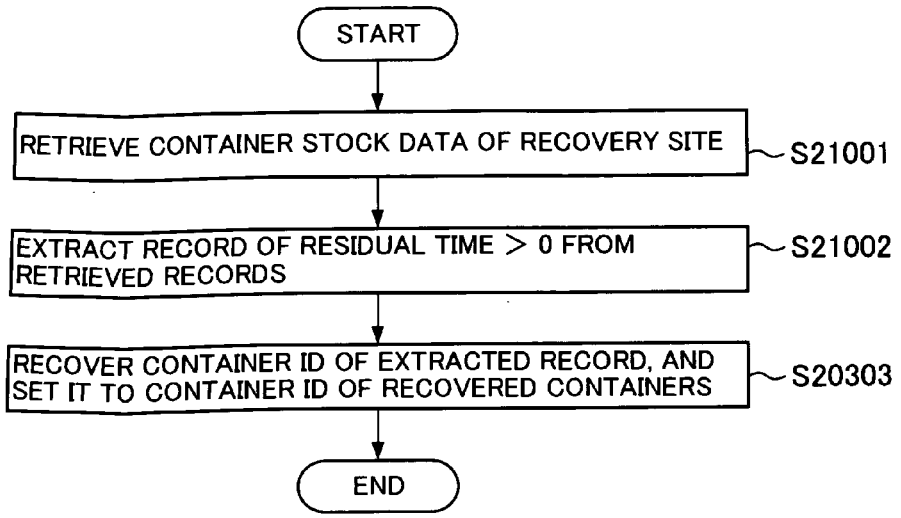
FIG. 14 is a diagram for explaining a recovered stock specifying routine (S210) of FIG. 10.

FIG. 14 is a diagram for explaining the recovered stock specifying routine (at S210) of FIG. 10.

At first, the transfer request processing unit 103 retrieves (at S21001), with reference to the container stock data storage unit 121, the record 1210, in which the recovery site ID (i.e., the site ID of the container recovering site) contained in the transfer request received through the network IF unit 160 from the hospital terminal 4 is registered in the field 1213.

Next, the transfer request processing unit 103 extracts (at S21002) the record 1210, in which the residual time of the field 1212 is left (the residual time>0), from the record 1210 retrieved at S21001. Then, the container having the container ID recorded in each field 1211 of the extracted record 1210 is set (at S21003) as the container to be recovered.

The description is continued by reverting to FIG. 2. The working code management unit 104 updates the working code management data storage unit 124 in accordance with the I/O report data of the container 8, which has been accepted through the network IF unit 160 from the container management center terminal 2, the culture center terminal 3 and the hospital terminal 4. In accordance with the inquiry demand accepted from the container management center terminal 2, the culture center terminal 3 and the hospital terminal 4, the working code management unit 104 sends the working code management data of the inquiry target to the sending terminal of that inquiry demand.

Figure 15:
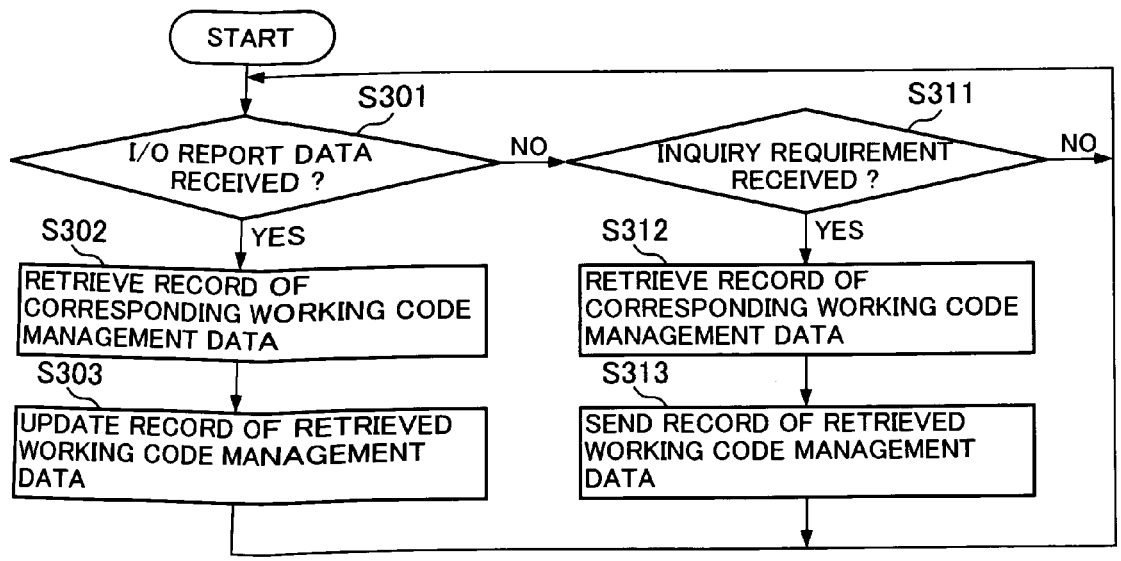
FIG. 15 is a flow chart for explaining the actions (or the working code management data updating routine) of the working code management unit 104.

FIG. 15 is a flow chart for explaining the actions (or the working code management data updating routine) of the working code management unit 104.

The working code management unit 104 retrieves (at S302) when it receives (if YES at S301) the I/O report data including the container ID, the site ID, the execution date/time and the I/O flag through the network IF unit 160 from any of the container management center terminal 2, the culture center terminal 3 and the hospital terminal 4, the record 1240 of the working code management data corresponding to that I/O report data from the working code management data storage unit 124.

In case the I/O flag contained in that I/O report data is the "outgoing", more specifically, the working code management unit 104 retrieves the record 1240 having fields 1242 to 1244, in which the container ID contained in that I/O report data is registered in the sub-field 12456, and in which the site ID contained in that I/O report data is registered in the sub-field 12451 which registers the site ID of the departure site. In case the I/O flag contained in that I/O report data is the "incoming", on the contrary, the working code management unit 104 retrieves the record 1240 having fields 1242 to 1244, in which the container ID contained in that I/O report data is registered in the sub-field 12456, and in which the site ID contained in that I/O report data is registered in the sub-field 12453 which registers the site ID of the arrival site. Here, the fields 1242 to 1244, in which the container ID contained in that I/O report data is registered in the sub-field 12456, and in which the site ID contained in that I/O report data is registered in the sub-field 12451 or 12453, will be called the corresponding field.

Next, the working code management unit 104 registers the execution date/time contained in that I/O report data, in the sub-field 12454 or 12455 of the corresponding field of the record 1240 retrieved, thereby to update the record of the working management data (at S303).

In case the I/O flag contained in that I/O report data is the "outgoing", more specifically, the execution date/time contained in that I/O report data is registered in the sub-field 12454 which registers the departure date/time of the corresponding field A. In case the I/O flag contained in that I/O report data is the "incoming", on the contrary, the execution date/time contained in that I/O report data is registered in the sub-field 12455 which registers the arrival date/time of the corresponding field A.

The working code management unit 104 retrieves (at S312), when it receives (if YES at S311) the inquiry demand including the container ID, the site ID, the execution date/time and the I/O flag through the network IF unit 160 from any of the container management center terminal 2, the culture center terminal 3 and the hospital terminal 4, the record 1240 of the working code management data corresponding to that inquiry demand from the working code management data storage unit 124.

In case the I/O flag contained in that inquiry demand is the "outgoing", more specifically, the working code management unit 104 retrieves the record 1240 having fields 1242 to 1244, in which the container ID contained in that inquiry demand is registered in the sub-field 12456, and in which the site ID contained in that inquiry demand is registered in the sub-field 12451 which registers the site ID of the departure site. In case the I/O flag contained in that inquiry demand is the "incoming", on the contrary, the working code management unit 104 retrieves the record 1240 having fields 1242 to 1244, in which the container ID contained in that inquiry demand is registered in the sub-field 12456, and in which the site ID contained in that inquiry demand is registered in the sub-field 12453 which registers the site ID of the arrival site.

Next, the working code management unit 104 reads the retrieved record 1240 from the working code management data storage unit 124, and sends (at S313) the record 1240 through the network IF unit 160 to the sender of that inquiry demand.

The explanation is continued by reverting to FIG. 2. The container environment history data management unit 105 registers the container environment history data in the container environment history data storage unit 123 in accordance with the environment history registration requirement received through the network IF unit 160 from the culture center terminal 3 or the hospital terminal 4.

Figure 16:
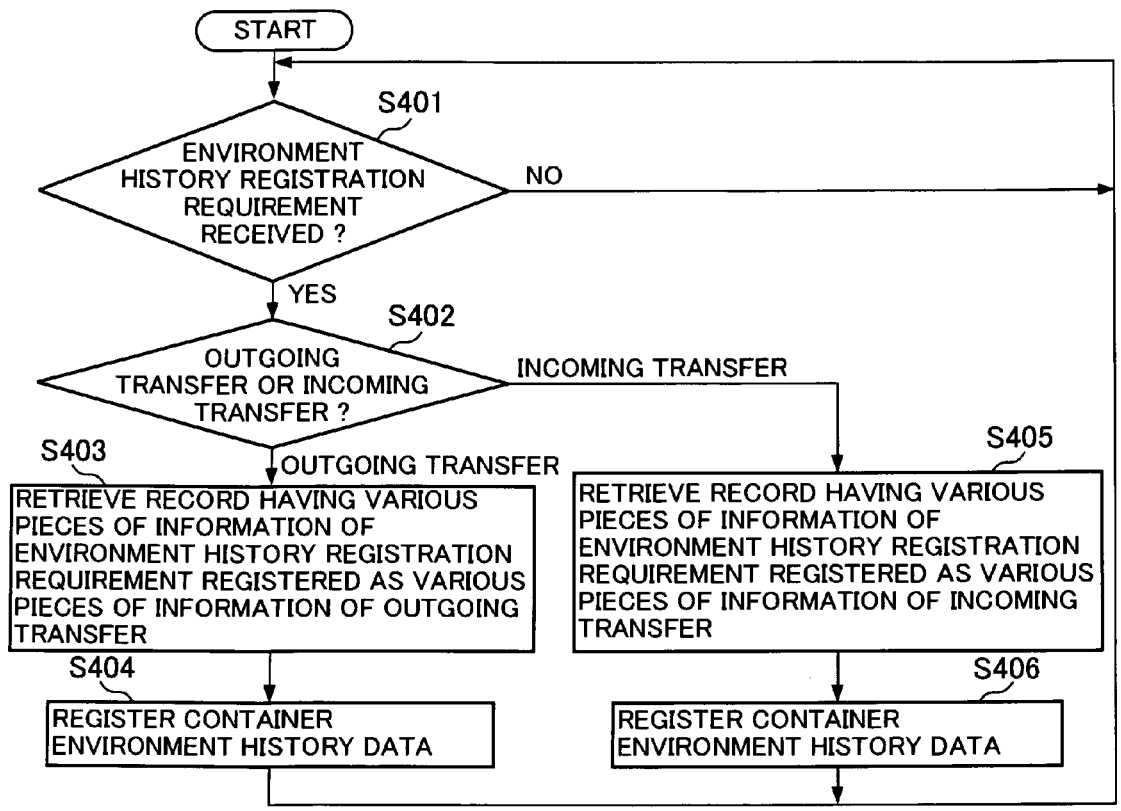
FIG. 16 is a flow chart for explaining the actions (or the container environment history data registering routine) of a container environment history data management unit 105.

FIG. 16 is a flow chart for explaining the actions (or the container environment history data registering routine) of the container environment history data management unit 105.

The container environment history data management unit 105 examines (at S402) it, when it receives the environment history registration demand containing the container ID, the site ID, the measurement history data and the transfer kind through the network IF unit 160 from either of the culture center terminal 3 and the hospital terminal 4, whether the environment flag contained in that environment history registration demand indicates the outgoing transfer or the incoming transfer.

In case the outgoing transfer is indicated at S402, the record 1240 of the working code management data, in which the container ID contained in that environment history registration demand is registered in the sub-field 12456 of the field 1243 and in which the site ID contained that environment history registration demand is registered in the sub-field 12453 of the field 1243, is retrieved (at S403) from the working code management data storage unit 124. Next, the container environment history data management unit 105 adds the new record 1230 to the container environment history data storage unit 123. Moreover (at S404): the container ID, which is registered in the sub-field 12456 of the field 1243 of the record 1240 retrieved at S403, is registered in the field 1231 of the record 1230 added; the working code, which is registered in the field 1241 of the record 1240 retrieved at S403, is registered in the field 1232 of the record 1230 added; the departure site ID and the arrival site ID, which are registered in the sub-fields 12451 and 12453 of the field 1243 of the record 1240 retrieved at S403, are registered in the sub-fields of the departure site ID and the arrival site ID of the field 1240 retrieved at S403; and the measurement history data (i.e., plural pieces of data composed of the measured value and measurement date/time of the environment data), which is registered in the environment history registration demand, is registered in the field 1234 of the added record 1230.

In case the outgoing transfer is indicated at S402, the record 1240 of the working code management data, in which the container ID contained in that environment history registration demand is registered in the sub-field 12456 of the field 1244 and in which the site ID contained that environment history registration demand is registered in the sub-field 12453 of the field 1244, is retrieved (at S405) from the working code management data storage unit 124. Next, the container environment history data management unit 105 adds the new record 1230 to the container environment history data storage unit 123. Moreover (at S406): the container ID, which is registered in the sub-field 12456 of the field 1244 of the record 1240 retrieved at S405, is registered in the field 1231 of the record 1230 added; the working code, which is registered in the field 1241 of the record 1240 retrieved at S405, is registered in the field 1232 of the record 1230 added; the departure site ID and the arrival site ID, which are registered in the sub-fields 12451 and 12453 of the field 1244 of the record 1240 retrieved at S405, are registered in the sub-fields of the departure site ID and the arrival site ID of the field 1240 retrieved at S405; and the measurement history data (i.e., plural pieces of data composed of the measured value and measurement date/time of the environment data), which is registered in the environment history registration demand, is registered in the field 1234 of the added record 1230.

The explanation is continued by reverting to FIG. 2. In accordance with the working code management data registered in the working code management data storage unit 124, the truck arrangement request creation unit 106 creates the truck arrangement request for arranging the truck 9 necessary for the transfer work, and sends it to the transportation arrangement center terminal 5.

Figure 17:
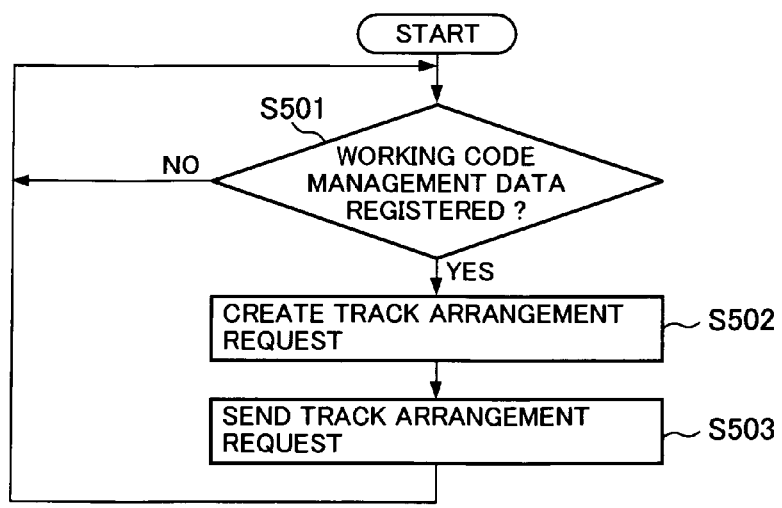
FIG. 17 is a flow chart for explaining the actions (or the truck arrangement request creating routine) of a truck arrangement request creation unit 106.

FIG. 17 is a flow chart for explaining the actions (or the truck arrangement request creating routine) of the truck arrangement request creation unit 106.

When the record 1240 of the working code management data is newly registered (if YES at S501) in the working code management data storage unit 124, the truck arrangement request creation unit 106 creates the truck arrangement request containing the working code 1241 registered in the field 1241 of that record 1240. In case the data is registered in the sub-fields 12451 to 12453 and 12456 of the field 1242 of that record 1240, that truck arrangement request includes the procurement transfer truck distribution data containing those pieces of data. In case the data is registered in the sub-fields 12451 to 12453 and 12456 of the field 1243 of that record 1240, that truck arrangement request includes the outgoing transfer truck distribution data containing those pieces of data. In case the data is registered in the sub-fields 12451 to 12453 and 12456 of the field 1244 of that record 1240, that truck arrangement request includes (at S502) the incoming transfer truck distribution data containing those pieces of data. The truck arrangement request creation unit 106 sends (at S503) the truck arrangement request thus created, through the network IF unit 160 to the transportation arrangement center terminal 5.

Figure 18:
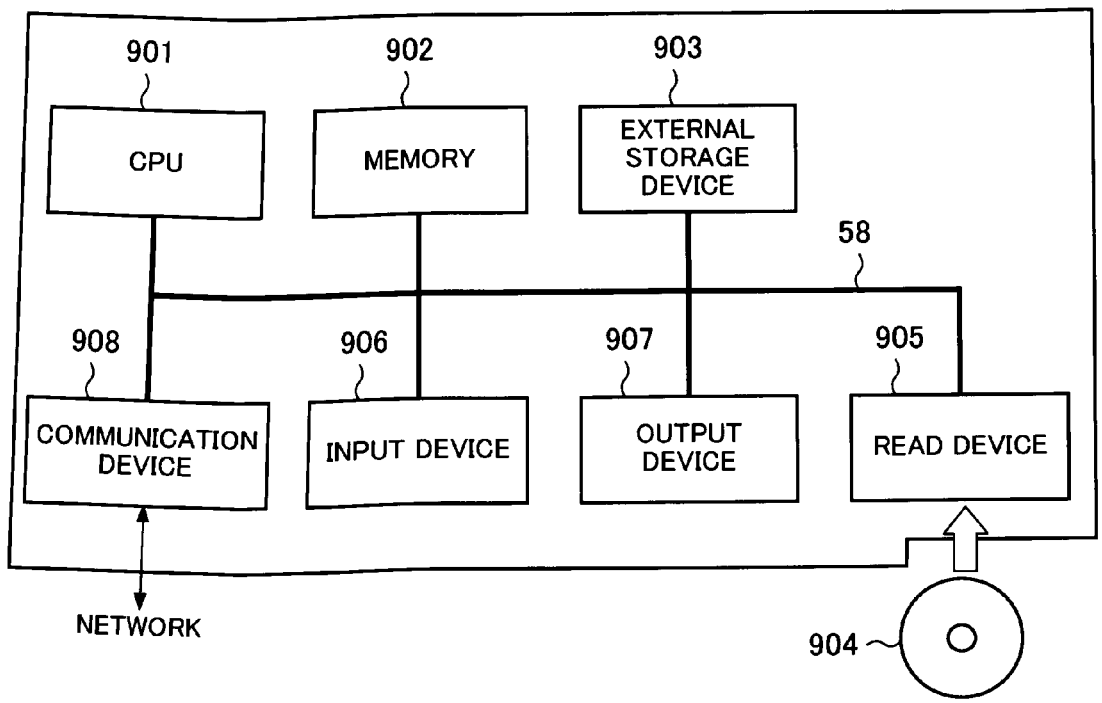
FIG. 18 is a diagram showing an example of the hardware configuration of the stock management device 1.

The stock management device 1 thus constituted can be so realized in the general computer system including: a CPU 901; a memory 902; an external storage device 903 such as an HDD; a read device 905 which reads information from a portable memory medium 904 such as a CD-ROM or a DVD-ROM; an input device 906 such as a keyboard or a mouse; an output device 907 such as a display; and a communication device 908 for connections with the communication network, that the CPU 901 executes a predetermined program loaded on the memory 902, as shown in FIG. 18, for example This predetermined program may be downloaded on the external storage device 903 either through the read device 905 from the storage medium 904 or through the communication device 908 from the network, and may be loaded on the memory 902 and executed by the CPU 901. Alternatively, the program may be loaded either through the read device 905 from the storage medium 904 or through the communication device 908 from the network, and may be directly loaded on the memory 902 and executed by the CPU 901. In this case: the memory 902, the external storage device 903 or the storage medium 904 is utilized as the storage unit 120; the input device 906, the output device 907 or the read device 905 is utilized as the I/O unit 140; and the communication device 908 is utilized as the network IF unit 160.

The stock management device 1 has been described hereinbefore.

Next, the container 8 is described in the following.

The container 8 measures and stores the status (or the environment data) of the cells to be housed (i.e., the cells housed in the Petri dish), as has been described herein before. The measured data is outputted to the outside together with the container ID given to the container 8.

Figure 19:
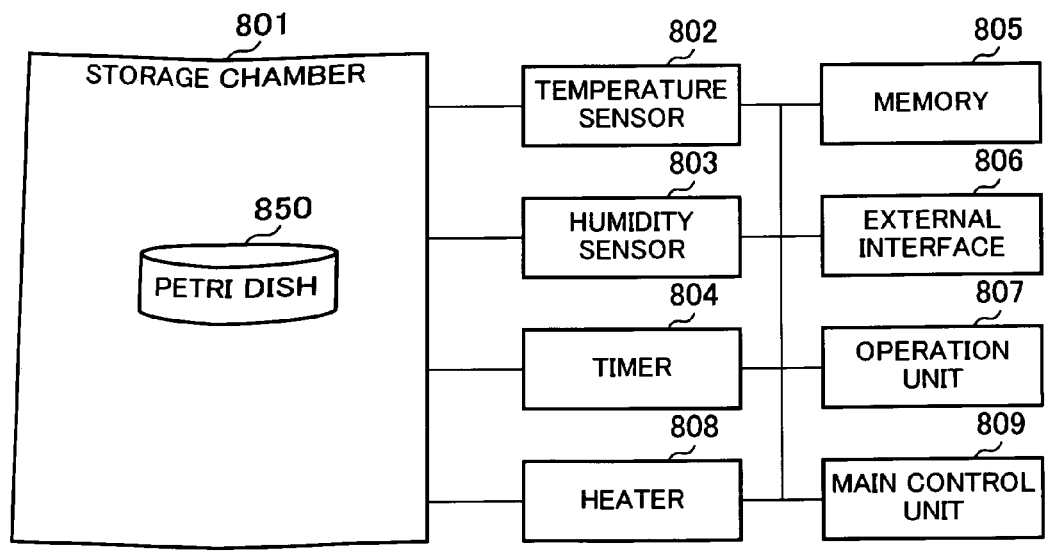
FIG. 19 is a schematic configuration diagram of a container 8.

FIG. 19 is a schematic configuration diagram of the container 8.

As shown, the container 8 to be used in this embodiment includes: a storage chamber 801 which stores a Petri dish 850 having cells housed therein; a temperature center 802 which measures the temperature of the inside of the storage chamber 801; a humidity sensor 803 which measures the humidity in the storage chamber 801; a timer 804; a memory 805 which stores the measured values of the container ID and the sensors 802 and 803 attached to the container 8; an external interface 806 which reads the data stored in the memory 805, to the outside; an operation unit 807 which accepts the operation from the user; a heater 808 which adjusts the temperature of the inside of the storage chamber 801; and a main control unit 809. Here, the external interface 806 can be exemplified by an RFID tag.

Figure 20:
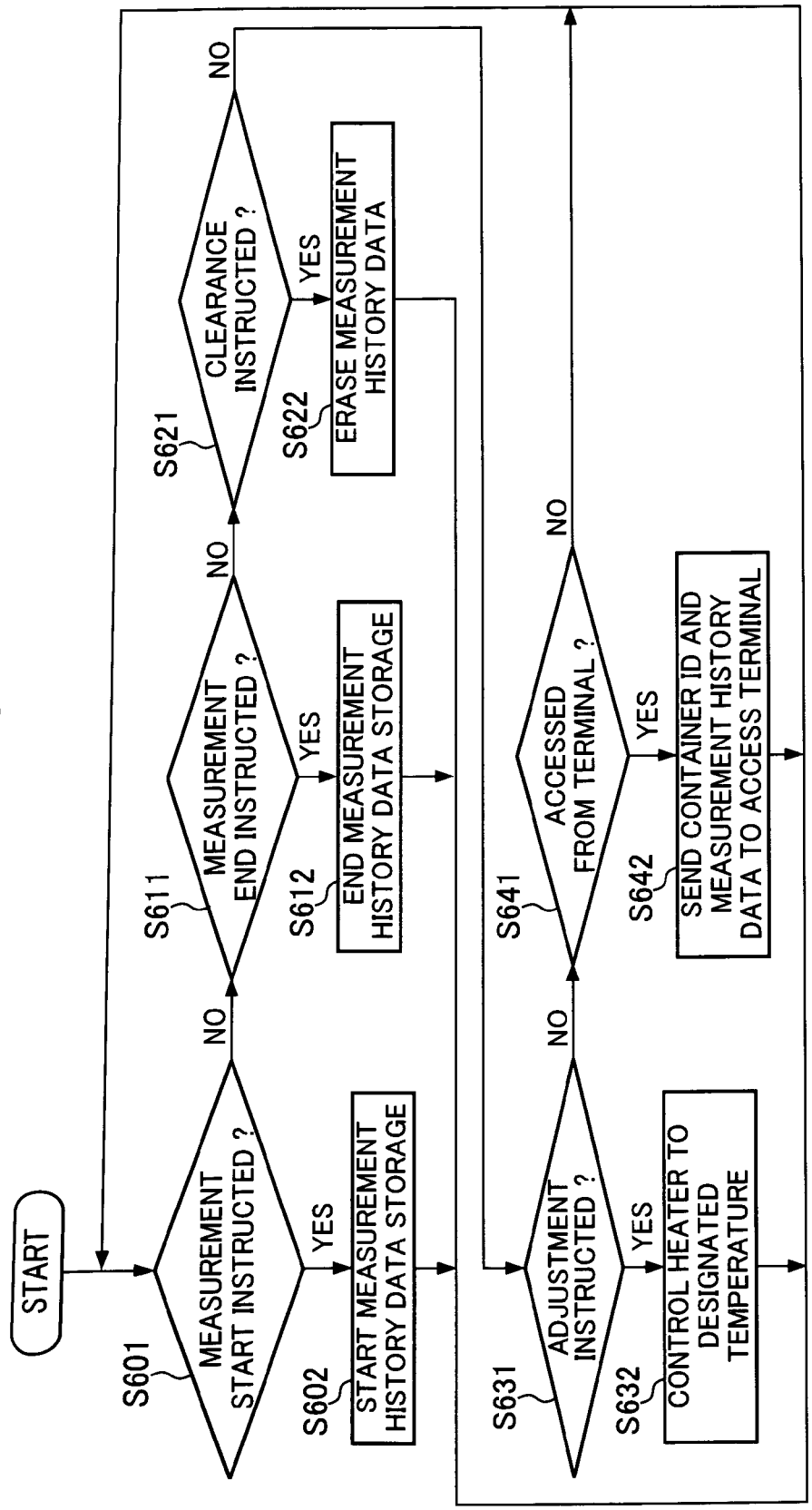
FIG. 20 is a flow chart for explaining the actions of the container 8.

FIG. 20 is a flow chart for explaining the actions of the container 8.

The main control unit 809 stores (at S602), when it accepts (if YES at S601) the measurement starting instruction from the user through the operation unit 807, the measured data of the temperature sensor 802 and the humidity sensor 803 periodically in the memory 805 such that the measured data correspond to the measurement date/time indicated by the timer 804. As a result, the measurement history data is stored in the memory 805.

Moreover, the main control unit 809 ends (at S612), when it accepts (if YES at S611) the measurement ending instruction from the user through the operation unit 807, the storages of the measured data of the temperature sensor 802 and the humidity sensor 803 in the memory 805.

Moreover, the main control unit 809 erases (at S622) when it accepts (if YES at S621) the clearing instruction of the measurement history data from the user through the operation unit 807, the measurement history data stored in the memory 805.

Moreover, the main control unit 809 controls (at S632), when it accepts (if YES at S631) the adjusting instruction of the heater from the user through the operation unit 807, the operation of the heater 808 so that the temperature indicated by the measurement data of the temperature sensor 802 may be that designated by that adjusting instruction.

When the main control unit 809 is accessed to (if YES at S641) through the external interface 806 by the container management center terminal 2, the culture center terminal 3 or the hospital terminal 4, it reads the container ID and the measurement history data from the memory 805 and sends (at S642) them to the access source terminals 2 to 4.

The container 8 has been described hereinbefore.

Next, the container management center terminal 2 is described in the following.

Figure 21:
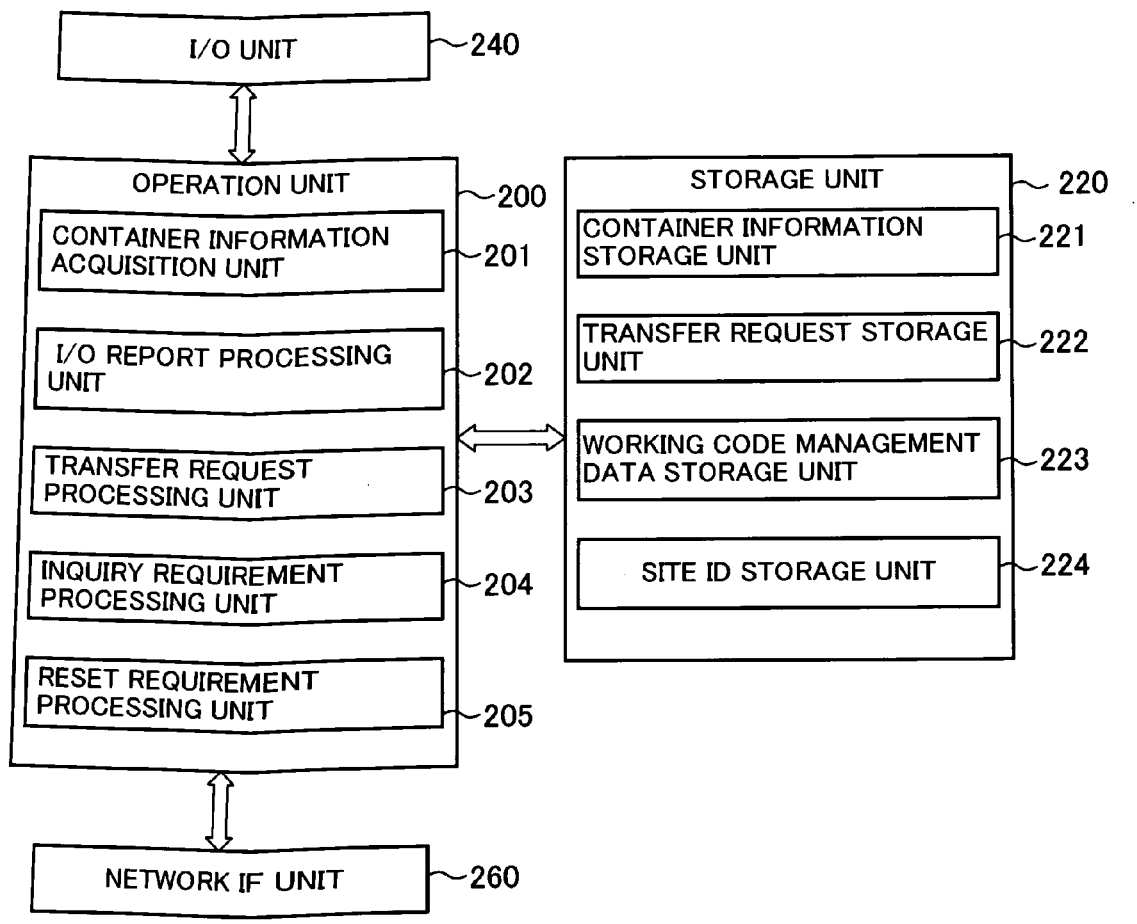
FIG. 21 is a schematic configuration diagram of a container management center terminal 2.

FIG. 21 is a schematic configuration diagram of the container management center terminal 2.

As shown, the container management center terminal 2 of this embodiment includes: an operation unit 200; a storage unit 220; an I/O unit 240 which inputs/outputs information to/from a peripheral device such as the keyboard, the display or the DC-ROM drive and a reader (e.g., the RFID tag reader) to readout the information from the container 8; and a network IF unit 260 for connections with the network 7.

The storage unit 220 includes a container information storage unit 221, a transfer request storage unit 222, a working code management data storage unit 223, and a site ID storage unit 224.

The container information storage unit 221 stores the information (i.e., the container ID and the measurement history data) acquired from the container 8.

The transfer request storage unit 222 stores the transfer request for the recovery transfer. As has been described hereinbefore, the transfer request includes the starting site ID and the ending site ID. In the transfer request for the recovery transfer, the site ID of the site (e.g., the hospital or the culture center) which recovers the container 8 is registered as the starting site ID, and the site ID of the container management center is registered as the ending site ID.

The working code management data storage unit 223 stores the working code management data acquired from the stock management device 1.

Moreover, the site ID of the container management center is registered in the site ID storage unit 224.

The operation unit 200 includes a container information acquisition unit 201, an I/O report processing unit 202, a transfer request processing unit 203, an inquiry requirement processing unit 204 and a reset requirement processing unit 205.

Figure 22:
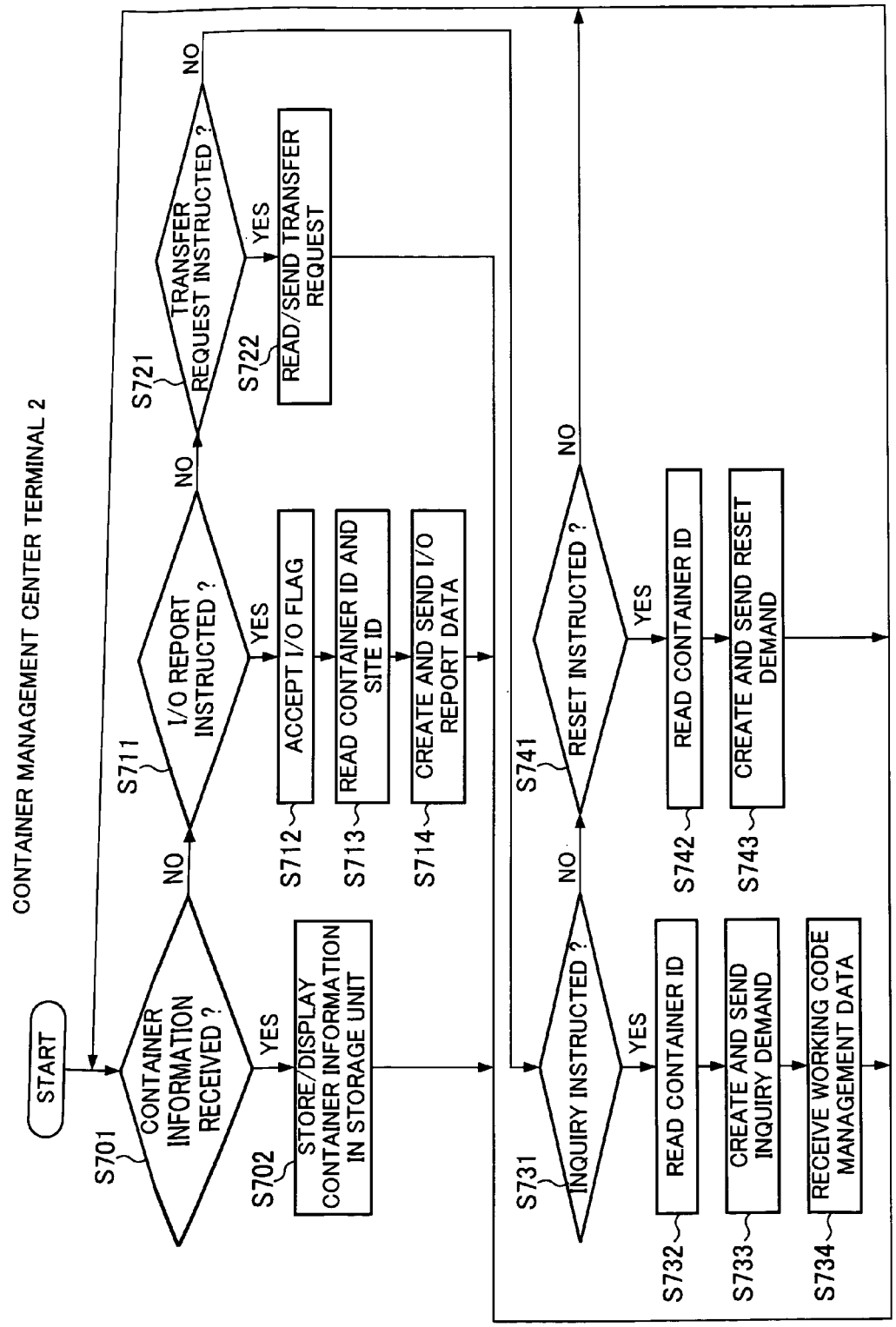
FIG. 22 is a flow chart for explaining the actions of the container management center terminal 2.

FIG. 22 is a flow chart for explaining the actions of the container management center terminal 2.

When the container information acquisition unit 201 receives (if YES at S701) the container ID and the measurement history data from the container 8 through the (not-shown) reader connected with the I/O nit 240, it stores those pieces of data in the container information storage unit 221 and outputs them from the I/O unit 240 (at S702).

When the I/O report processing unit 202 accepts (if YES at S711) the I/O report instruction from the user through the I/O unit 240, it further accepts (at S712) an I/O flag indicating the incoming or the outgoing, from the user through the I/O unit 240. Moreover, the I/O report processing unit 202 reads (at S713) the container ID and the site ID from the container information storage unit 221 and the site ID storage unit 223, and creates and sends (at S714) the I/O report data containing those pieces of information to the stock management device 1 through the network IF unit 260.

When the transfer request processing unit 203 accepts (if YES at S721) the transfer request instruction from the user through the I/O unit 240, it reads (at S722) the transfer request data for the recovery transfer from the transfer request storage unit 222 and sends it to the stock management device 1 through the network IF unit 260.

When the inquiry requirement processing unit 204 accepts (if YES at S731) the inquiry instruction from the user through the I/O unit 240, it reads (at S732) the container ID from the container information storage unit 221 to create the inquiry requirement containing that container ID, and sends (at S733) the inquiry requirement to the stock management device 1 through the network IF unit 260. Moreover, the inquiry requirement processing unit 204 receives the working code management data or the response to that inquiry requirement from the stock management device 1, and stores that data in the working code management data storage unit 223 and outputs it from the I/O unit 240 (at S734).

When the reset requirement processing unit 205 receives (if YES at S741) from the user through the I/O unit 240, it reads (at S742) the container ID stored in the container information storage unit 221. The reset requirement processing unit 205 creates the reset requirement containing the read container ID, and sends (at S743) it to the stock management device 1 through the network IF unit 260.

As in the stock management device 1, the container management center terminal 2 thus constituted can also be realized such that the CPU 901 in the computer system shown in FIG. 18 executes the predetermined program loaded on the memory 902. This predetermined program may also be downloaded on the external storage device 903 either from the storage medium 904 through the read device 905 or from the network through the communication device 908, and may then be loaded on the memory 902 and executed by the CPU 901. Moreover, the program may also be directly loaded on the memory 902 either from the storage medium 904 through the read device 905 or from the network through the communication device 908, and may be executed by the CPU 901. In this case: the memory 902, the external storage device 903 or the storage medium 904 is utilized as the storage unit 220; the input device 906, the output device 907 or the read device 905 is utilized as the I/O unit 240; and the communication device 908 is utilized as the network IF unit 260.

The container management center terminal 2 has been described hereinbefore.

Next, the culture center terminal 3 is described in the following.

Figure 23:
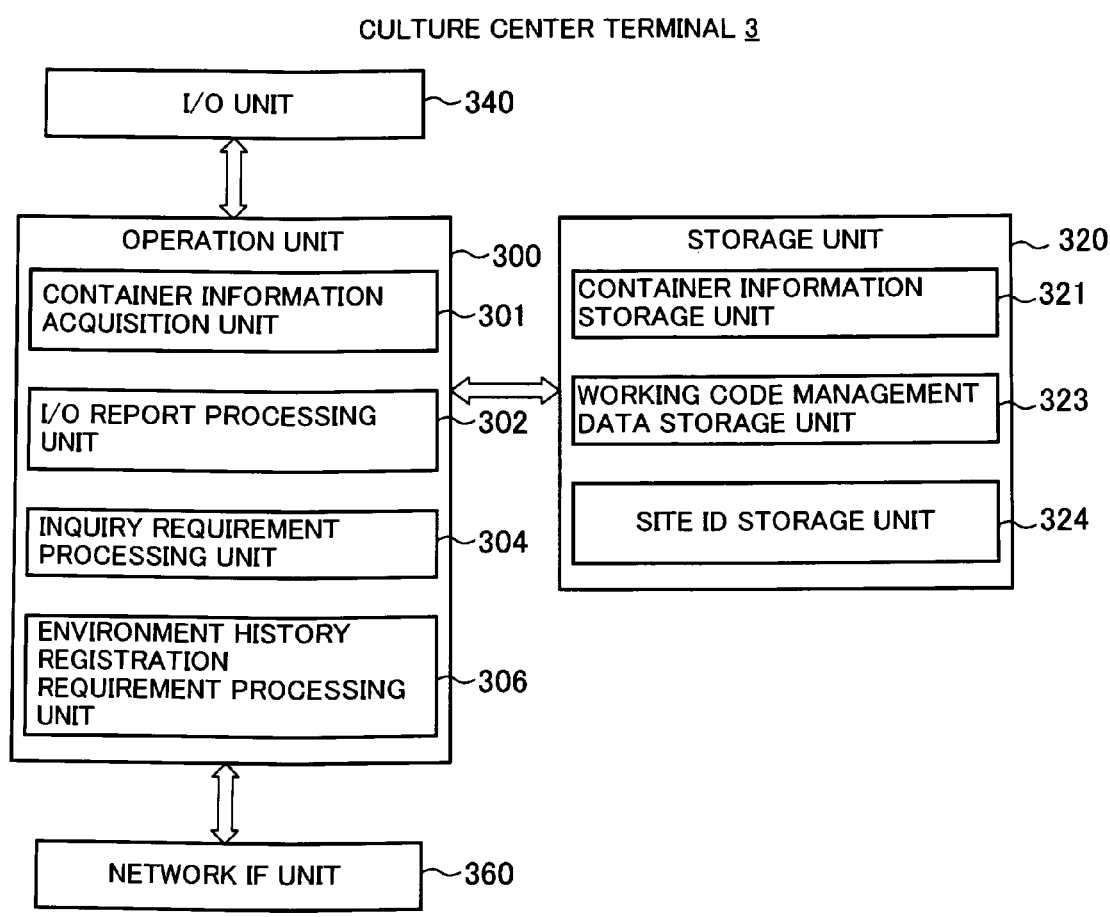
FIG. 23 is a schematic configuration diagram of a culture center terminal 3.

FIG. 23 is a schematic configuration diagram of the culture center terminal 3.

As shown, the culture center terminal 3 of this embodiment includes: an operation unit 300; a storage unit 320; an I/O unit 340 which inputs/outputs information to/from a peripheral device such as the keyboard, the display or the DC-ROM drive and a reader (e.g., the RFID tag reader) to read out the information from the container 8; and a network IF unit 360 for connections with the network 7.

The storage unit 320 includes a container information storage unit 321, a working code management data storage unit 323, and a site ID storage unit 324.

The container information storage unit 321 stores the information (i.e., the container ID and the measurement history data) acquired from the container 8.

The working code management data storage unit 323 stores the working code management data acquired from the stock management device 1.

Moreover, the site ID of the culture center is registered in the site ID storage unit 324.

The operation unit 300 includes a container information acquisition unit 301, an I/O report processing unit 302, an inquiry requirement processing unit 304 and an environment history registration requirement processing unit 306.

Figure 24:
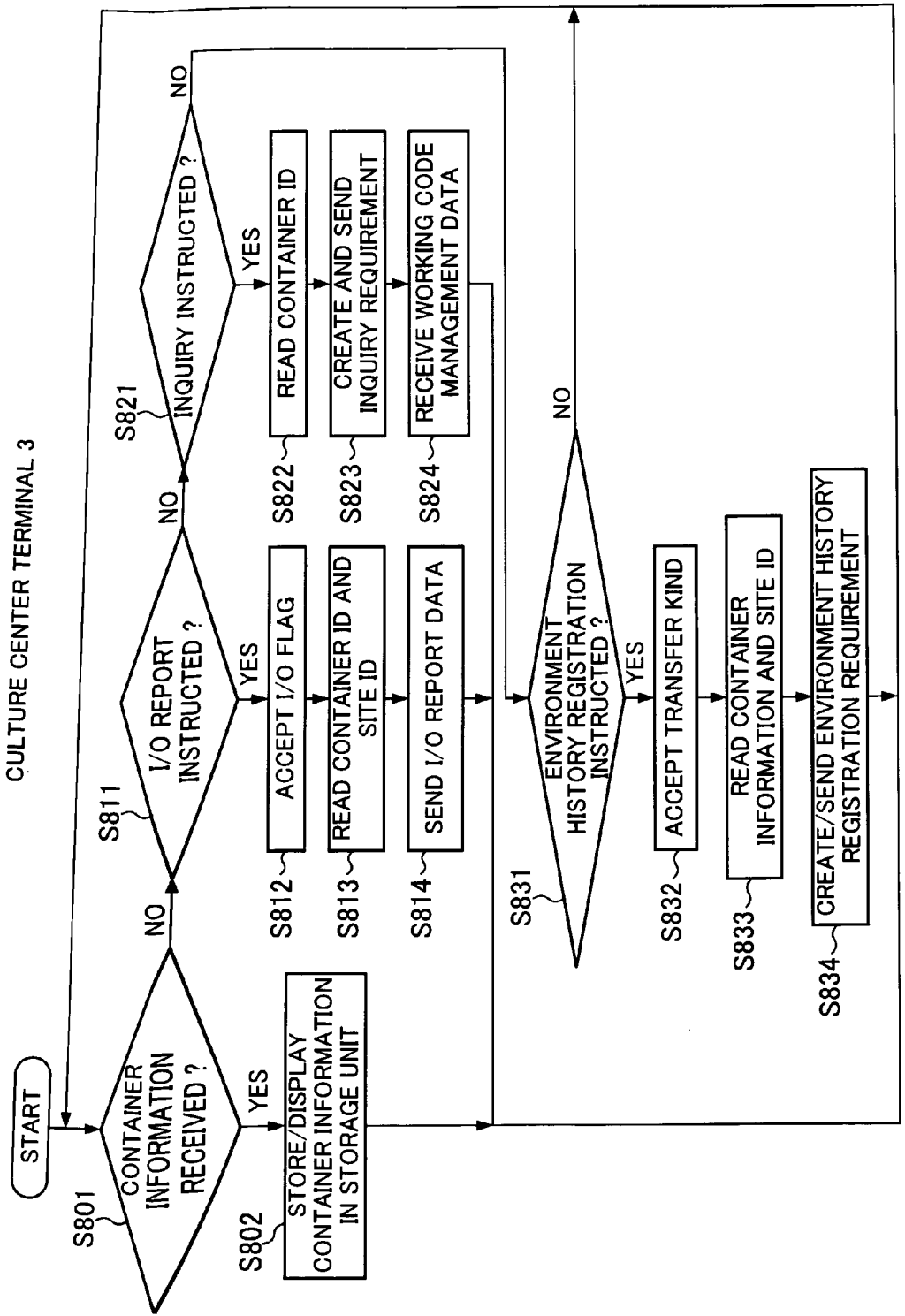
FIG. 24 is a flow chart for explaining the actions of the culture center terminal 3.

FIG. 24 is a flow chart for explaining the actions of the culture center terminal 3.

The container information acquisition unit 301 stores (at S802), when it receives (if YES at S801) the container ID and the measurement history data from the container 8 through the (not-shown) reader connected with the I/O unit 340, those pieces of data in the container information storage unit 321 and outputs them from the I/O unit 340.

When the I/O report processing unit 302 accepts (if YES at S811) the I/O report instruction from the user through the I/O unit 340, it further accepts (at S812) an I/O flag indicating the incoming or the outgoing, from the user through the I/O unit 340. Moreover, the I/O report processing unit 302 reads (at S813) the container ID and the site ID from the container information storage unit 321 and the site ID storage unit 323, and creates and sends (at S814) the I/O report data containing those pieces of information to the stock management device 1 through the network IF unit 360.

When the inquiry requirement processing unit 304 accepts (if YES at S821) the inquiry instruction from the user through the I/O unit 340, it reads (at S822) the container ID from the container information storage unit 321 to create the inquiry requirement containing that container ID, and sends (at S823) the inquiry requirement to the stock management device 1 through the network IF unit 360. Moreover, the inquiry requirement processing unit 304 receives the working code management data or the response to that inquiry requirement from the stock management device 1, and stores that data in the working code management data storage unit 323 and outputs it from the I/O unit 340 (at S824).

When the environment history registration requirement processing unit 306 receives (if YES at S831) the environment history registration instruction from the user through the I/O unit 340, it further accepts (at S832) the transfer kind flag indicating the outgoing transfer or the incoming transfer from the user through the I/O unit 340. Moreover, the environment history registration requirement processing unit 306 reads the container ID and the measurement history data from the container information storage unit 321, and reads (at S833) the site ID from the site ID storage unit 324, and creates the environment history registration requirement containing those container ID, measurement history data, site ID and transfer kind flag, and sends (at S834) that requirement to the stock management device 1 through the network IF unit 360.

As in the stock management device, the culture center terminal 3 thus constituted can also be realized such that the CPU 901 in the computer system shown in FIG. 18 executes the predetermined program loaded on the memory 902. This predetermined program may also be downloaded on the external storage device 903 either from the storage medium 904 through the read device 905 or from the network through the communication device 908, and may then be loaded on the memory 902 and executed by the CPU 901. Moreover, the program may also be directly loaded on the memory 902 either from the storage medium 904 through the read device 905 or from the network through the communication device 908, and may bee executed by the CPU 901. In this case: the memory 902, the external storage device 903 or the storage medium 904 is utilized as the storage unit 320; the input device 906, the output device 907 or the read device 905 is utilized as the I/O unit 340; and the communication device 908 is utilized as the network IF unit 360.

The culture center terminal 3 has been described hereinbefore.

Next, the hospital terminal 4 is described in the following.

Figure 25:
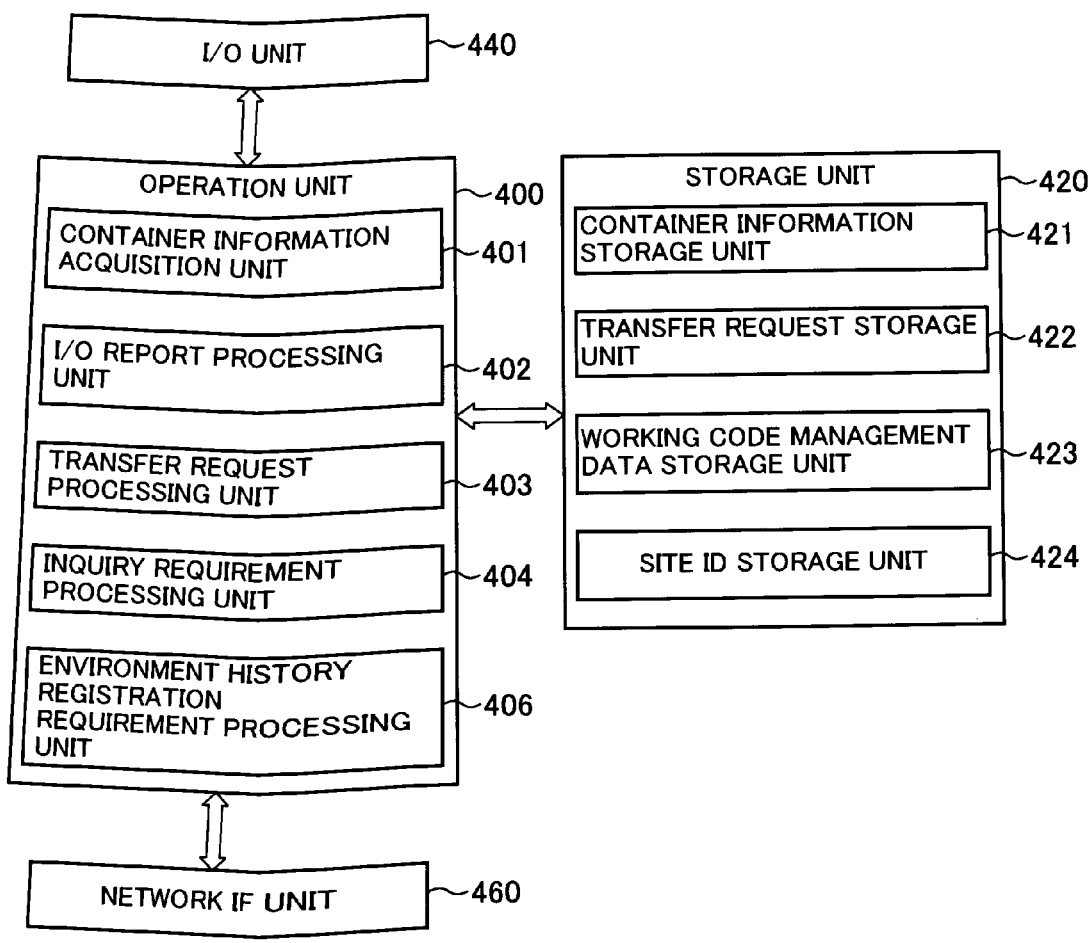
FIG. 25 is a schematic configuration diagram of a hospital terminal 4.

FIG. 25 is a schematic configuration diagram of the hospital terminal 4.

As shown, the hospital terminal 4 of this embodiment includes: an operation unit 400; a storage unit 420; an I/O unit 440 which inputs/outputs information to/from a peripheral device such as the keyboard, the display or the DC-ROM drive and a reader (e.g., the RFID tag reader) to read out the information from the container 8; and a network IF unit 460 for connections with the network 7.

The storage unit 420 includes a container information storage unit 421, a transfer request storage unit 422, a working code management data storage unit 423, and a site ID storage unit 424.

The container information storage unit 421 stores the information (i.e., the container ID and the measurement history data) acquired from the container 8.

The transfer request storage unit 422 stores the transfer request for the ordinary transfer. As has been described hereinbefore, the transfer request includes the starting site ID and the ending site ID. In the transfer request for the ordinary transfer, the site ID of the hospital, to which the self hospital terminal 3 belongs, is registered as the starting site ID, and the site ID of the culture center is registered as the ending site ID.

The working code management data storage unit 423 stores the working code management data acquired from the stock management device 1.

Moreover, the site ID of the hospital, to which the self hospital terminal 3 belongs, is registered in the site ID storage unit 424.

The operation unit 400 includes a container information acquisition unit 401, an I/O report processing unit 402, a transfer request processing unit 403, an inquiry requirement processing unit 404 and an environment history registration requirement processing unit 406.

Figure 26:
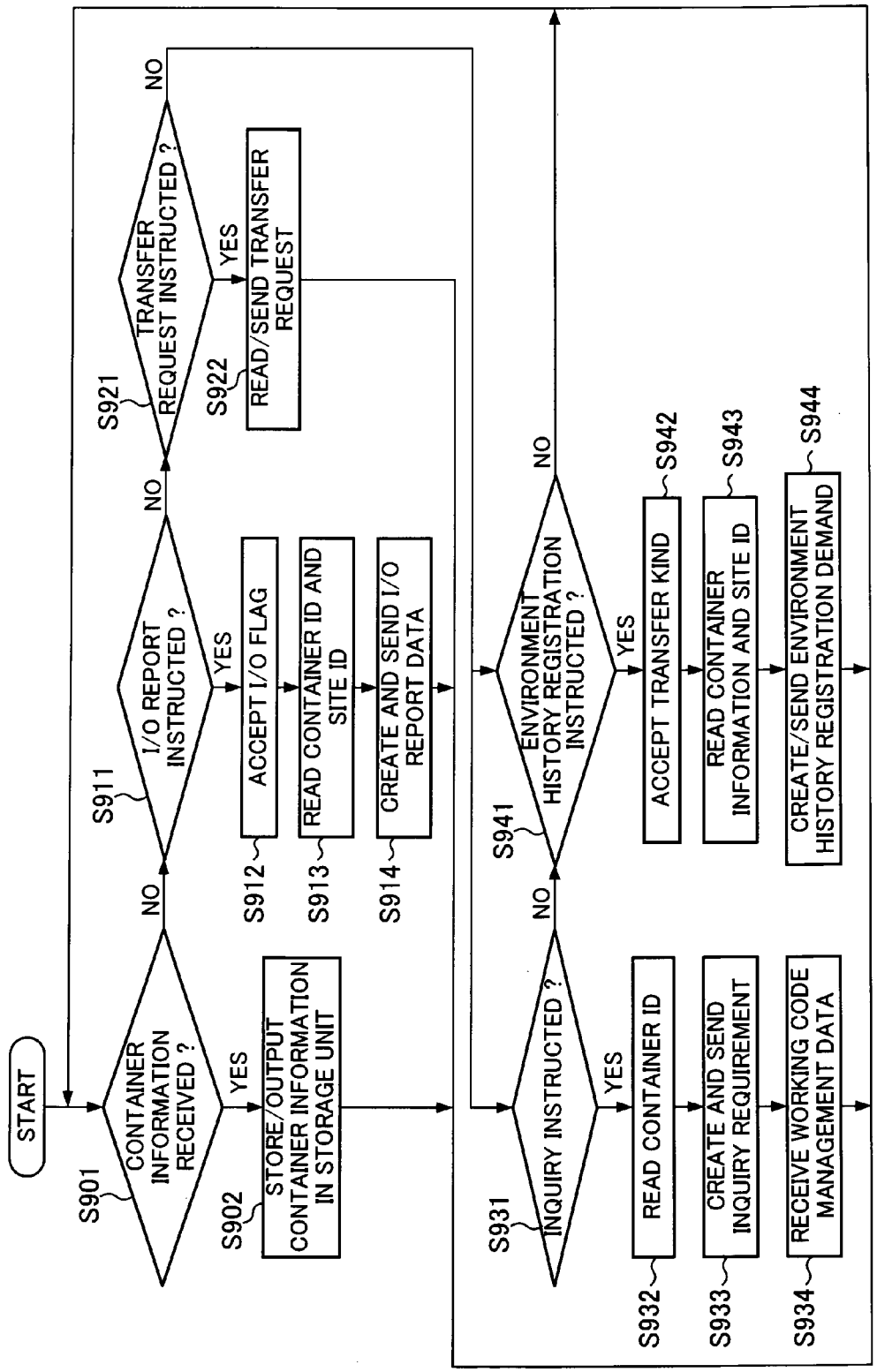
FIG. 26 is a flow chart for explaining the actions of the hospital terminal 4.

FIG. 26 is a flow chart for explaining the actions of the hospital terminal 4.

The container information acquisition unit 401 stores (at S902), when it receives (if YES at S901) the container ID and the measurement history data from the container 8 through the (not-shown) reader connected with the I/O unit 440, those pieces of data in the container information storage unit 421.

When the I/O report processing unit 402 accepts (if YES at S911) the I/O report instruction from the user through the I/O unit 440, it further accepts (at S912) an I/O flag indicating the incoming or the outgoing, from the user through the I/O unit 440. Moreover, the I/O report processing unit 402 reads (at S913) the container ID and the site ID from the container information storage unit 421 and the site ID storage unit 423, and creates and sends (at S914) the I/O report data containing those pieces of information to the stock management device 1 through the network IF unit 460.

When the transfer request processing unit 403 accepts (if YES at S921) the transfer request instruction from the user through the I/O unit 440, it reads the transfer request data for the ordinary transfer from the transfer request storage unit 422 and sends it to the stock management device 1 through the network IF unit 460 (at S922).

When the inquiry requirement processing unit 404 accepts (if YES at S931) the inquiry instruction from the user through the I/O unit 440, it reads (at S932) the container ID from the container information storage unit 421 to create the inquiry requirement containing that container ID, and sends (at S933) the inquiry requirement to the stock management device 1 through the network IF unit 460. Moreover, the inquiry requirement processing unit 404 receives the working code management data or the response to that inquiry requirement from the stock management device 1, and stores that data in the working code management data storage unit 423 and outputs it from the I/O unit 440 (at S934).

When the environment history registration requirement processing unit 406 receives (if YES at S941) the environment history registration instruction from the user through the I/O unit 440, it further accepts (at S942) the transfer kind flag indicating the outgoing transfer or the incoming transfer from the user through the I/O unit 440. Moreover, the environment history registration requirement processing unit 406 reads the container ID and the measurement history data from the container information storage unit 421, and reads (at S943) the site ID from the site ID storage unit 424, and creates the environment history registration requirement containing those container ID, measurement history data, site ID and transfer kind flag, and sends (at S944) that requirement to the stock management device 1 through the network IF unit 460.

As in the stock management device, the hospital terminal 4 thus constituted can also be realized such that the CPU 901 in the computer system shown in FIG. 18 executes the predetermined program loaded on the memory 902. This predetermined program may also be downloaded on the external storage device 903 either from the storage medium 904 through the read device 905 or from the network through the communication device 908, and may then be loaded on the memory 902 and executed by the CPU 901. Moreover, the program may also be directly loaded on the memory 902 either from the storage medium 904 through the read device 905 or from the network through the communication device 908, and may be executed by the CPU 901. In this case: the memory 902, the external storage device 903 or the storage medium 904 is utilized as the storage unit 420; the input device 906, the output device 907 or the read device 905 is utilized as the I/O unit 440; and the communication device 908 is utilized as the network IF unit 360.

The hospital terminal 4 has been described hereinbefore.

Next, the transportation arrangement center terminal 5 is described in the following. This transportation arrangement center terminal 5 receives the truck arrangement request sent from the stock management device 1 through the network 7, and presents it to the user. The detailed description of the transportation arrangement center terminal 5 is omitted, because this terminal can utilize the existing network terminal.

Next, the actions of the container stock management system thus constituted are described in the following.

Figure 27:
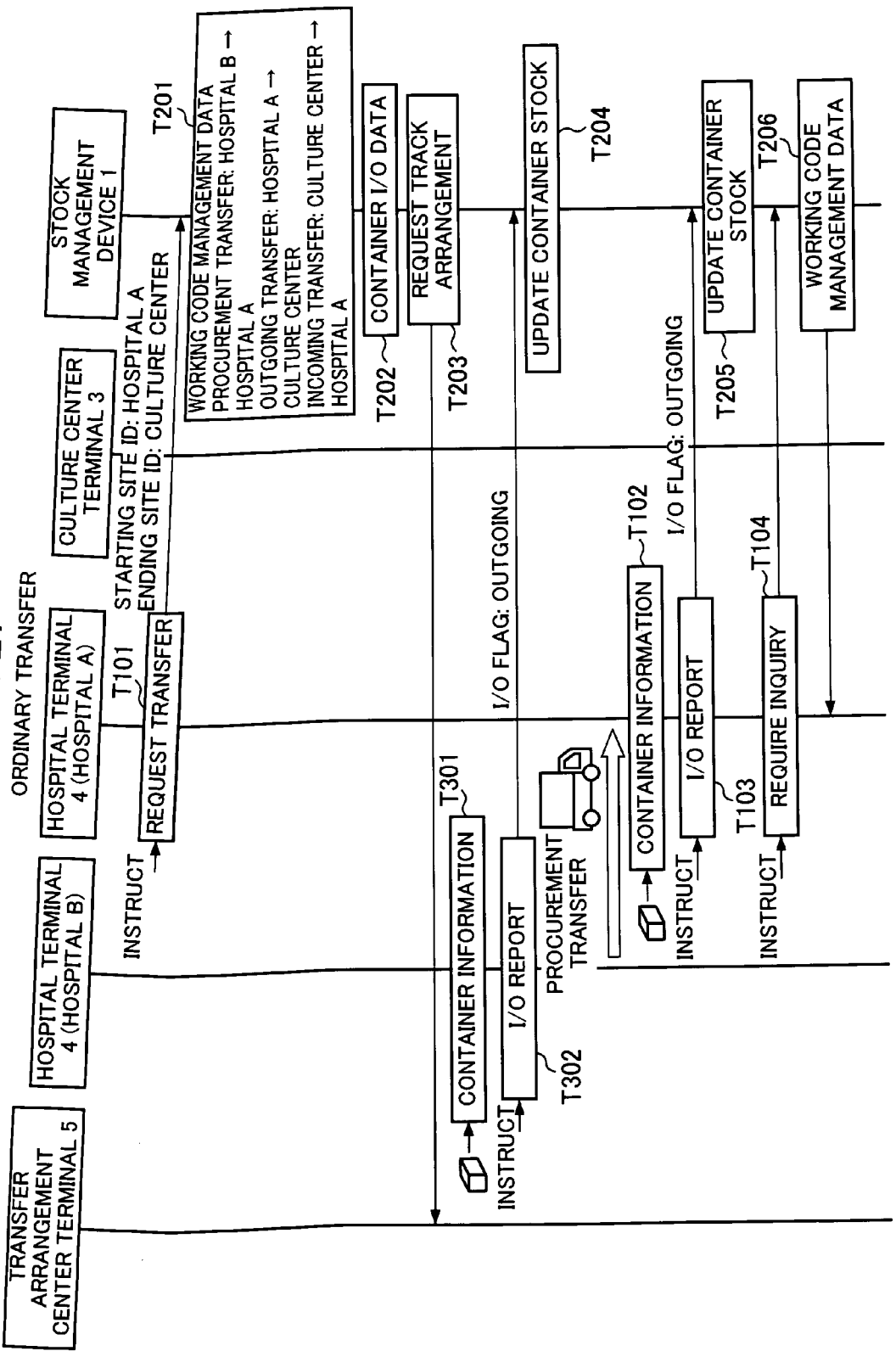
FIG. 27 is a diagram for explaining the action flows in the ordinary transfer of the container stock management system shown in FIG. 1.
Figure 28:
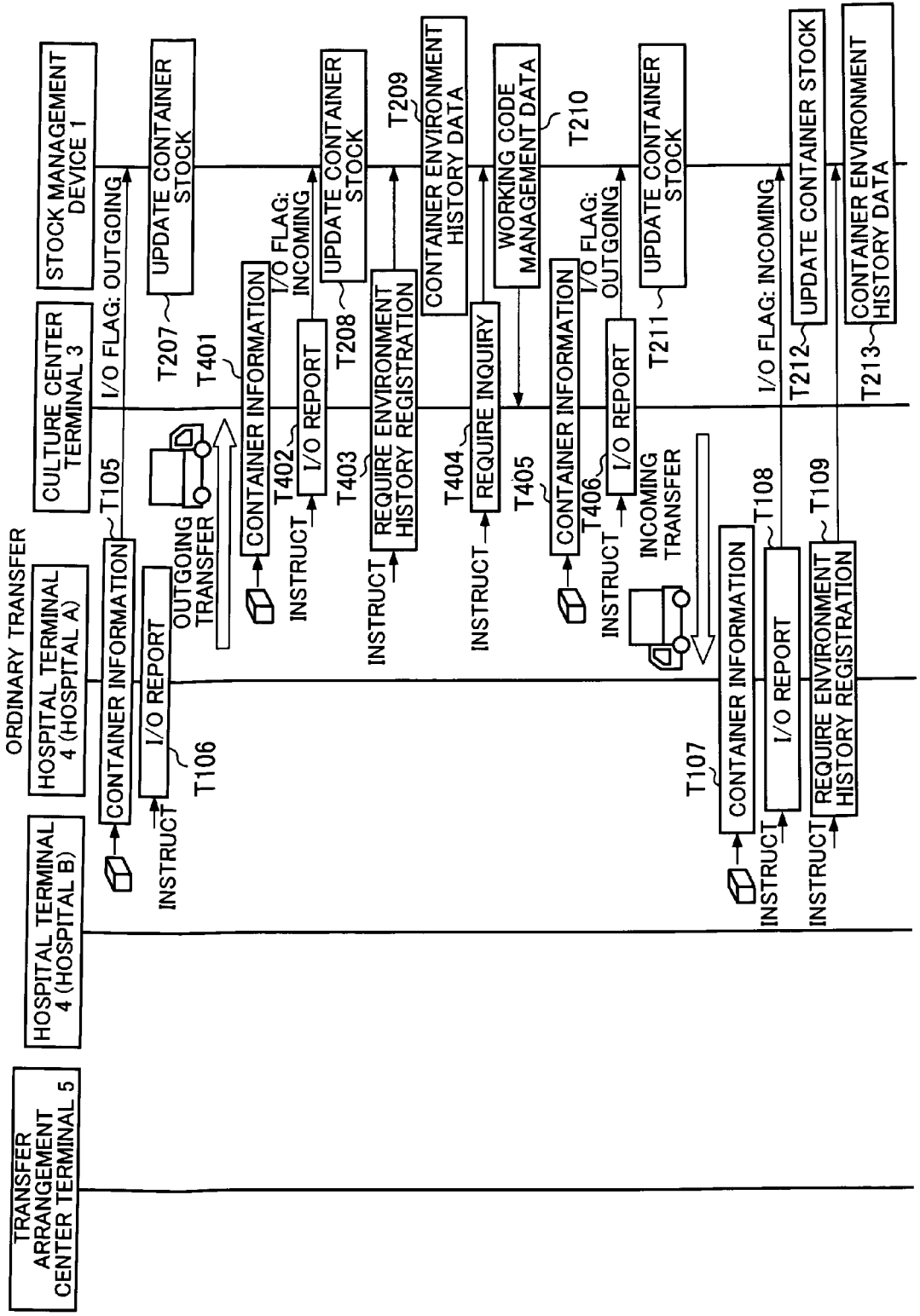
FIG. 28 is a diagram for explaining the action flows in the ordinary transfer of the container stock management system shown in FIG. 1.

FIG. 27 and FIG. 28 are diagrams for explaining the action flows in the ordinary transfers of the container stock management system shown in FIG. 1. Here is imagined the case, in which the hospital A has requested the culture center to culture cells.

The hospital terminal 4 of the hospital A sends (at T101), in accordance with the instruction by the user, the transfer request of the ordinary transfer having the starting site at the hospital A and the ending site at the culture center, to the stock management device 1.

The stock management device 1 executes, when it receives the transfer request of the ordinary transfer, the operations of S203 to S209 of FIG. 10, thereby to create and register (at T201 and at T202) the working code management data and the container I/O data. Here, the hospital A has no stock of the container 8. It is, therefore, assumed that there are created: the working code management data which is composed of the procurement transfer from a hospital B to the hospital A, the outgoing transfer from the hospital A to the culture center and the incoming transfer from the culture center to the hospital A; and the contain I/O data which manages the input/output of the container, as caused by those procurement transfer, outgoing transfer and incoming transfer.

Next, the stock management device 1 executes, when the working code management data is registered, the operations S501 to S503 shown in FIG. 17, to create the truck arrangement request for the procurement transfer, the outgoing transfer and the incoming transfer indicated by the working code management data, and sends (at T203) the truck arrangement request to the transportation arrangement center terminal 5. This transportation arrangement center terminal 5 receives the truck arrangement request from the stock management device 1 and outputs it. As a result, the transportation arrangement center arranges the truck 9 in accordance with the contents of the truck arrangement request.

As a result, the procurement transfer is performed to transfer the empty container 8 from the hospital B to the hospital A. The driver of the truck 9 examines the various pieces of information of the procurement transfer contained in the truck arrangement request, and notifies the hospital B of the container ID of the container 8 for the procurement transfer. In response to this notification, the user of the hospital B reads the container information by means of the (not-shown) reader from the container 8 having the container ID notified. The hospital terminal 4 of the hospital B acquires and registers (at T301) that container information. Next, the hospital terminal 4 of the hospital B creates, in accordance with the instruction from the user, the I/O report data having the container ID contained in the container information acquired at T301, the site ID of the hospital B and the I/O flag indicating the outgoing. The hospital terminal 4 sends (at T302) the I/O report data to the stock management device 1. After this, the container 8 is procured and transferred by the truck 9 from the hospital B to the hospital A. The stock management device 1 changes, in accordance with the I/O report data received from the hospital B, the execution flag of the corresponding container I/O data from "unset" to "set". Moreover, the stock management device 1 updates (at T204) the corresponding working code management data.

Now, the user of the hospital A reads, when it accepts the container 8 having been subjected to the procurement transfer from the truck 9, the container information from that container 8 by means of the (not-shown) reader. The hospital terminal 4 of the hospital A acquires and registers (at T102) that container information. Next, the hospital terminal 4 of the hospital A creates, in accordance with the instruction from the user, the I/O report data having the container ID contained in the container information acquired at T102, the site ID of the hospital A and the I/O flag indicating the incoming. The hospital terminal 4 sends (at T103) the I/O report data to the stock management device 1. The stock management device 1 changes, in accordance with the I/O report data received from the hospital A, the execution flag of the corresponding container I/O data from "unset" to "set". Moreover, the stock management device 1 updates (at T205) the corresponding working code management data.

The hospital terminal 4 of the hospital A creates (at T104) the inquiry requirement containing the container ID contained in the container information acquired at T102, the I/O flag indicating the "incoming" received from the user of the hospital A and the ending site ID indicating the hospital A, and sends that inquiry requirement to the stock management device 1. This stock management device 1 retrieves (at T206) the working code management data having the transfer information containing the contenna ID, the I/O flag and the ending site ID contained in the inquiry requirement, and sends that management data to the hospital terminal 4 of the hospital A. As a result, the user of the hospital A can confirm what container should be used to transfer the Petri dish confining the cells sampled from the patient, to the culture center.

At the hospital A, the Petri dish, in which the cells sampled from the patient are confined, is housed in the container 8 for the outgoing transfer. Thus, there is performed the outgoing transfer to transfer the container 8 containing the sampled cells from the hospital A to the culture center.

Now, the user of the hospital A reads the container information from that container 8 containing the Petri dish of the sampled cells by means of the (not-shown) reader. The hospital terminal 4 of the hospital A acquires and registers (at T105) that container information. Next, the hospital terminal 4 of the hospital A creates, in accordance with the instruction from the user, the I/O report data having the container ID contained in the container information acquired at T105, the site ID of the hospital A and the I/O flag indicating the outgoing. The hospital terminal 4 sends (at T106) the I/O report data to the stock management device 1. After this, the container 8 is transferred by the truck 9 to go out from the hospital A to the culture center. The stock management device 1 changes, in accordance with the I/O report data received from the hospital A, the execution flag of the corresponding container I/O data from "unset" to "set". Moreover, the stock management device 1 updates (at T207) the corresponding working code management data.

Now, the user of the culture center reads, when it accepts the container 8 having been subjected to the outgoing transfer from the truck 9, the container information from that container 8 by means of the (not-shown) reader. The culture center terminal 3 acquires and registers and outputs (at T401) that container information. The user of the culture center is enabled to manage the status during the outgoing transfer by confirming that container information. Next, the culture center terminal 3 creates, in accordance with the instruction from the user, the I/O report data having the container ID contained in the container information acquired at T401, the site ID of the culture center and the I/O flag indicating the incoming. The culture center terminal 3 sends (at T402) the I/O report data to the stock management device 1. The stock management device 1 changes, in accordance with the I/O report data received from the culture center terminal 3, the execution flag of the corresponding container I/O data from "unset" to "set". Moreover, the stock management device 1 updates (at T208) the corresponding working code management data.

Moreover, the culture center terminal 3 creates, in accordance with the instruction from the user, the environment history registration requirement having the container ID and the measurement history data contained in the container information acquired at T401, and the site ID of the culture center. The culture center terminal 3 sends (at T403) that environment history registration requirement to the stock management device 1. The stock management device 1 registers (at T209), in accordance with the environment history requirement received from the culture center terminal 3, the container environment history data in the outgoing transfer from the hospital A to the culture center.

At the culture center, the sampled cells are cultured and confined in the Petri dish. Now, the culture center terminal 3 creates (at T404) the inquiry requirement containing the container ID contained in the container information acquired at T401, the I/O flag indicating the "incoming" received from the user of the culture center, and the ending site ID indicating the culture center, and sends that inquiry requirement to the stock management device 1. This stock management device 1 retrieves (at T210) the working code management data having the container ID, the I/O flag and the ending site ID contained in the inquiry requirement, and sends the management data to the culture center terminal 3. As a result, the user of the culture center can confirm what container should be used to transfer the Petri dish confining the cells sampled from the patient, to the hospital A.

At the culture center, the Petri dish confining the cultured cells is housed in the container 8 for the incoming transfer. Thus, there is performed the incoming transfer to transfer the container 8 containing the cultured cells from the culture center to the hospital A.

Now, the user of the culture center reads the container information from that container 8 containing the Petri dish of the cultured cells by means of the (not-shown) reader. The culture center terminal 3 acquires and registers (at T405) that container information. Next, the culture center terminal 3 creates, in accordance with the instruction from the user, the I/O report data having the container ID contained in the container information acquired at T405, the site ID of the culture center and the I/O flag indicating the outgoing. The culture center terminal 3 sends (at T406) the I/O report data to the stock management device 1. After this, the container 8 is transferred by the truck 9 to come from the culture center into the hospital A. The stock management device 1 changes, in accordance with the I/O report data received from the culture center terminal 3, the execution flag of the corresponding container I/O data from "unset" to "set". Moreover, the stock management device 1 updates (at T211) the corresponding working code management data.

Now, the user of the hospital A reads, when it accepts the container 8 having been subjected to the incoming transfer from the truck 9, the container information from that container 8 by means of the (not-shown) reader. The hospital terminal 4 of the hospital A acquires and registers and outputs (at T107) that container information. The user of the hospital A is enabled to manage the status during the outgoing transfer by confirming that container information. Next, the hospital terminal 4 of the hospital A creates, in accordance with the instruction from the user, the I/O report data having the container ID contained in the container information acquired at T107, the site ID of the hospital A and the I/O flag indicating the incoming. The hospital terminal 4 sends (at T108) the I/O report data to the stock management device 1. The stock management device 1 changes, in accordance with the I/O report data received from the hospital terminal 4 of the hospital A, the execution flag of the corresponding container I/O data from "unset" to "set". Moreover, the stock management device 1 updates (at T212) the corresponding working code management data.

Moreover, the hospital terminal 4 of the hospital A creates, in accordance with the instruction from the user, the environment history registration requirement having the container ID and the measurement history data contained in the container information acquired at T107, and the site ID of the hospital A. The hospital terminal 4 sends (at T109) that environment history registration requirement to the stock management device 1. The stock management device 1 registers (at T213), in accordance with the environment history requirement received from the hospital terminal 4 of the hospital A, the container environment history data in the incoming transfer from the culture center to the hospital A.

FIG. 29 is a diagram for explaining the action flows in the recovery transfer of the container stock management system shown in FIG. 1. Here is imagined the case, in which the recovery of the stock container of the hospital A is imagined.

The container management center terminal 2 sends (at T501), in accordance with the instruction by the user, the transfer request of the recovery transfer having the starting site at the hospital A and the ending site at the container management center, to the stock management device 1.

The stock management device 1 executes, when it receives the transfer request of the recovery transfer, the operations of S210 to S213 of FIG. 10, thereby to create and register (at T251 and at T252) the working code management data and the container I/O data. Here are created the working code management data which is composed of the procurement transfer from the hospital A to the container management center, and the container I/O data which manages the incoming and dispatch from the container, as caused by that procurement transfer.

Next, the stock management device 1 executes, when the working code management data is registered, the operations S501 to S503 shown in FIG. 17, to create the truck arrangement request for the procurement transfer indicated by the working code management data, and sends (at T253) the truck arrangement request to the transportation arrangement center terminal 5. This transportation arrangement center terminal 5 receives the truck arrangement request from the stock management device 1 and outputs it. As a result, the transportation arrangement center arranges the truck 9 in accordance with the contents of the truck arrangement request.

As a result, the procurement transfer is performed to transfer the container 8 to be recovered, from the hospital A to the container management center. The driver of the truck 9 examines the various pieces of information of the procurement transfer contained in the truck arrangement request, and notifies the hospital A of the container ID of each container 8 for the procurement transfer. In response to this notification, the user of the hospital A reads the container information by means of the (not-shown) reader from each container 8 having the container ID notified. The hospital terminal 4 of the hospital A acquires and registers (at T351) those pieces of container information. Next, the hospital terminal 4 of the hospital A creates, in accordance with the instruction from the user, the I/O report data having each container ID contained in the container information acquired at T351, the site ID of the hospital A and the I/O flag indicating the outgoing. The hospital terminal 4 sends (at T352) the I/O report data to the stock management device 1. After this, the container 8 is procured and transferred by the truck 9 from the hospital A to the container management center. The stock management device 1 changes, in accordance with the I/O report data received from the hospital A, the execution flag of the corresponding container I/O data from "unset" to "set". Moreover, the stock management device 1 updates (at T254) the corresponding working code management data.

Now, the user of the container management center reads, when it accepts each container 8 having been subjected to the procurement transfer from the truck 9, the container information from each container 8 by means of the (not-shown) reader. The container management center terminal 2 acquires and registers (at T502) those pieces of container information. Next, the container management center terminal 2 creates, in accordance with the instruction from the user, the I/O report data having each container ID contained in the container information acquired at T502, the site ID of the container management center and the I/O flag indicating the incoming. The container management center terminal 2 sends (at T503) the I/O report data to the stock management device 1. The stock management device 1 changes, in accordance with the I/O report data received from the container management center terminal 2, the execution flag of the corresponding container I/O data from "unset" to "set". Moreover, the stock management device 1 updates (at T255) the corresponding working code management data.

The invention has been described hereinbefore on one embodiment thereof.

In the embodiment, the outgoing transfer and the incoming transfer are managed in one working code, and the transfer work and the container ID of the container 8 used in each transfer work are made to correspond to the same working code. In the transfer of the container 8, therefore, it is possible to make the cells sampled from the patient and the cells cultured from those cells correspond to each other. Moreover, the container stock at each hospital and at the culture center is examined to decide the optimum transfer route including the procurement transfer of the container so that the container stock number at each hospital and at the culture center can be reduced while suppressing the transfer cost of the container.

Here, the invention should not be limited to the embodiment thus far described but can be modified in various manners within the scope of its gist. For example, the stock management device 1 may be realized by using a plurality of computers. Moreover, the embodiment has been described on the case, in which the invention is applied to the transfer of cells between the hospital and the culture center. However, the invention can also be applied to the case, in which other articles are transferred between a plurality of sites.

What is claimed is:

1. A stock management method for a computer to manage a stock of containers reserved for transfer between sites,
    wherein the computer includes a storage device which stores container stock data indicating the stock of containers at each site, container input and output data indicating incoming and outgoing stock schedule of the containers at each site, and link data containing link moving time between each site, and
    wherein the computer includes a computation device which performs each of the following steps:

an accepting step of accepting a transfer request containing a starting site, a scheduled date and time of dispatch from the starting site, an ending site, and a schedule for dispatch from the ending site, through an input device of the computer;

a site stock calculating step of calculating the stock of containers at the scheduled date and time of dispatch from a site by using the container stock data and the container input and output data of each of the starting site and the ending site contained in the transfer request;

a procurement site searching step of searching a procurement site to procure a container for a stockless site, in the absence of container stock at the scheduled date and time for dispatch from the starting site or at the scheduled date and time for dispatch from the ending site;

a stock reserving step of determining a container to be reserved for procurement transfer from the procurement site to the stockless site, by respectively using the container stock data and the container input and output data of the starting site, the ending site and the procurement site, in cases in which the container to be reserved for an outgoing transfer from the starting site to the ending site, the container to be reserved for incoming transfer from the ending site to the starting site, and the procurement site are searched;

a working code issuing step of issuing, to make a correspondence, an identical working code to the outgoing transfer data including a container to be reserved for the outgoing transfer from the starting site to the ending site, the incoming transfer data including a container to be reserved for the incoming transfer from the ending site to the starting site, and procurement transfer data including a container to be reserved for the procurement transfer from the procurement site to the stockless site, in cases in which the procurement site is searched; and an output step of outputting, from an output device of the computer, the outgoing transfer data and the incoming transfer data, to which the identical working code corresponds, and the procurement transfer data in cases in which the procurement site is searched, together with the working code;

wherein the site stock calculating step includes:
a step of calculating the container stock at the scheduled date and time of dispatch from the starting site, by adding the increase or decrease in number of the container stock, which is determined by the container input and output data of the starting site, up to the scheduled date and time of dispatch from the starting site, to the current container stock number determined by the container stock data of the starting site; and a step of calculating the container stock at the scheduled date and time of dispatch from the ending site, by adding the increase or decrease in number of the container stock, which is determined by the container input and output data of the ending site, up to the scheduled date and time of dispatch from the ending site, to the current container stock number determined by the container stock data of the ending site.

2. A stock management method according to claim 1, wherein the procurement site searching step includes:

a procurement site stock calculating step of calculating, for procurement site candidates, in turn, other than the stockless site, a scheduled date and time of dispatch from a procurement site candidate, by using link data between the procurement site candidate and the stockless site, thereby to calculate the stock of the container on the scheduled date and time of dispatch from the procurement site candidate; and a procurement site selecting step of selecting, as the procurement site, the site for which the link moving time, indicated by the link data between the sites having and not having the container stock, is the shortest, among the site candidates which have container stock at the scheduled dispatch date and time.

3. A stock management method according to claim 2, wherein the procurement site stock calculating step calculates the stock of containers on the scheduled date and time of dispatch from the procurement site candidate, by adding the link moving time indicated by the link data between the procurement site candidate and the site not having the stock, to the scheduled date and time of dispatch from the stockless site.

4. A stock management method according to claim 2, wherein the procurement site stock calculating step calculates the stock of containers on the scheduled date and time of dispatch from the procurement site candidate, by adding the container stock increase or decrease in number up to the scheduled date and time of dispatch from the procurement site candidate, which is determined by the container input and output data of the procurement site candidate, to the current container stock number determined by the container stock data of the procurement site candidate.

5. A stock management method according to claim 1, wherein the stock reserving step:

determines the container to be reserved for the outgoing transfer from the starting site to the ending site, from among the stock indicated by the container stock data of the starting site and the stock scheduled to come in by the scheduled date and time of dispatch from the starting site, outside of stock scheduled to be dispatched by the scheduled date and time of dispatch from the starting site;

determines the container to be reserved for the incoming transfer from the ending site to the starting site, from among the stock indicated by the container stock data of the ending site and the stock scheduled to come in by the scheduled date and time of dispatch from the ending site, outside of stock scheduled to be dispatched by the scheduled date and time of dispatch from the ending site; and in cases in which the procurement site is searched, determines the container to be reserved for the procurement transfer from the procurement site to the stockless site, from among the stock indicated by the container stock data of the procurement site and the stock scheduled to come in by the scheduled date and time of dispatch from the procurement site, outside of stock scheduled to be dispatched by the scheduled date and time of dispatch from the procurement site.

6. A stock management method according to claim 1, wherein the input device of the computer is connected with a network, and wherein the accepting step accepts the transfer request from another terminal through the network.

7. A stock management device which manages a stock of containers to be reserved for transfer between sites, the device comprising:

means for storing container stock data indicating the stock of the container at each site;

means for storing container input and output data indicating an outgoing and incoming schedule of the container at each site;

means for storing which link data containing link moving time between each site;

means for accepting a transfer request containing a starting site, a scheduled date and time of dispatch from the starting site, an ending site, and a schedule for dispatch from the ending site;

site stock calculating means which for calculating the stock of containers at the scheduled date and time of dispatch from the site by using the container stock data and the container input and output data of each of the starting site and the ending site contained in the transfer request;

procurement site searching means for searching the procurement site to procure a container for a stockless site, when there is no stock of containers at the scheduled date and time of dispatch from the starting site nor at the scheduled date and time of dispatch from the ending site;

stock reserving means for determining the container to be reserved for the procurement transfer from the procurement site to the stockless site, by respectively using the container stock data and the container input and output data of the starting site, the ending site and the procurement site, in cases in which the container to be reserved for an outgoing transfer from the starting site to the ending site, the container to be reserved for the incoming transfer from the ending site to the starting site, and the procurement site are searched;

working code issuing means for issuing, to make a correspondence, an identical working code to the outgoing transfer data including a container to be reserved for the outgoing transfer from the starting site to the ending site, incoming transfer data including a container to be reserved for the incoming transfer from the ending site to the starting site, and procurement transfer data including a container to be reserved for the procurement transfer from the procurement site to the stockless site, in cases in which the procurement site is searched; and output means for outputting, from the output device of the computer, the outgoing transfer data and the incoming transfer data, to which the identical working code corresponds, and the procurement transfer data in cases in which the procurement site is searched, together with the working code;

wherein the site stock calculating means includes:

means for calculating the container stock at the scheduled date and time of dispatch from the starting site, by adding the increase or decrease in number of the container stock, which is determined by the container input and output data of the starting site, up to the scheduled date and time of dispatch from the starting site, to the current container stock number determined by the container stock data of the starting site; and means for calculating the container stock at the scheduled date and time of dispatch from the ending site, by adding the increase or decrease in number of the container stock, which is determined by the container input and output data of the ending site, up to the scheduled date and time of dispatch from the ending site, to the current container stock number determined by the container stock data of the ending site.

8. A stock management software program stored on a computer medium which manages a stock of containers reserved for transfer between sites, wherein access is made to container stock data indicating the stock of containers of each site, container input and output data indicating the incoming and outgoing schedule of the container at each site, and link data containing link moving time between each site, which are stored in a storage device of a computer, and wherein a computation device of the computer is configured to execute each of the following steps of the software program:

an accepting step of accepting a transfer request containing a starting site, a scheduled date and time of dispatch from the starting site, an ending site, and a schedule of dispatch from the ending site, through an input device of the computer;

a step of calculating the container stock at the scheduled date and time of dispatch from the starting site by adding the increase or decrease in number of the container stock, which is determined by the container input and output data of the starting site, up to the scheduled date and time of dispatch from the starting site, to the current container stock number determined by the container stock data of the starting site;

a step of calculating the container stock at the scheduled date and time of dispatch from the ending site by adding the increase or decrease in number of the container stock, which is determined by the container input and output data of the ending site, up to the scheduled date and time of dispatch from the ending site, to the current container stock number determined by the container stock data of the ending site;

a procurement site stock calculating step of calculating, for procurement site candidates, in turn, other than the stockless site, a scheduled date and time of dispatch from a procurement site candidate, by using link data between the procurement site candidate and the stockless site, thereby to calculate the stock of the container on the scheduled date and time of dispatch from the procurement site candidate;

a procurement site selecting step of selecting, as the procurement site, the site for which the link moving time, indicated by the link data between the sites having and not having the container stock, is the shortest, among the site candidates which have container stock at the scheduled dispatch date and time;

a stock reserving step of determining the container to be reserved for the procurement transfer from the procurement site to the stockless site, by respectively using the container stock data and the container input and output data of the starting site, the ending site and the procurement site, in cases in which the container to be reserved for an outgoing transfer from the starting site to the ending site, the container to be reserved for the incoming transfer from the ending site to the starting site, and the procurement site are searched;

a working code issuing step of issuing, to make a correspondence, an identical working code to outgoing transfer data including a container to be reserved for the outgoing transfer from the starting site to the ending site, incoming transfer data including a container to be reserved for the incoming transfer from the ending site to the starting site, and procurement transfer data containing a container to be reserved for the procurement transfer from the procurement site to the stockless site, in cases in which the procurement site is searched; and an output step of outputting, from the output device of the computer, the outgoing transfer data and the incoming transfer data, to which the identical working cod corresponds, and the procurement transfer data, in cases in which the procurement site is searched, together with the working code.

* * * * *